United States Patent
Arita et al.

(10) Patent No.: US 7,496,679 B2
(45) Date of Patent: Feb. 24, 2009

(54) PACKET COMMUNICATION APPARATUS

(75) Inventors: Hiroshi Arita, Hitachi (JP); Yasuhiro Nakatsuka, Tokai-mura (JP); Yasuwo Watanabe, Hitachiohta (JP); Yoshihiro Tanaka, Sagamihara (JP); Kenji Furuhashi, Hitachi (JP)

(73) Assignee: Renesas Technology Corp., Tokyo (JP)

( * ) Notice: Subject to any disclaimer, the term of this patent is extended or adjusted under 35 U.S.C. 154(b) by 686 days.

(21) Appl. No.: 10/446,929

(22) Filed: May 29, 2003

(65) Prior Publication Data
US 2004/0034713 A1  Feb. 19, 2004

(30) Foreign Application Priority Data
May 30, 2002 (JP) ............................. 2002-156614
Mar. 4, 2003 (JP) ............................. 2003-056479

(51) Int. Cl.
G06F 15/16 (2006.01)

(52) U.S. Cl. ................ 709/232; 709/230; 709/231; 709/236; 709/238

(58) Field of Classification Search ................ 709/203, 709/230–232, 236, 238
See application file for complete search history.

(56) References Cited

U.S. PATENT DOCUMENTS

| | | | | |
|---|---|---|---|---|
| 5,010,546 | A * | 4/1991 | Kato | 370/469 |
| 6,034,964 | A * | 3/2000 | Fukushima et al. | 370/401 |
| 6,212,195 | B1 * | 4/2001 | McCormack et al. | 370/419 |
| 6,266,340 | B1 * | 7/2001 | Pickett et al. | 370/442 |
| 6,434,620 | B1 * | 8/2002 | Boucher et al. | 709/230 |
| 6,650,650 | B1 * | 11/2003 | Schneider et al. | 370/412 |
| 6,904,049 | B1 * | 6/2005 | Maeda | 370/421 |
| 6,920,109 | B2 * | 7/2005 | Yazaki et al. | 370/230.1 |
| 2003/0007489 | A1 * | 1/2003 | Krishnan et al. | 370/392 |
| 2003/0095560 | A1 * | 5/2003 | Arita et al. | 370/431 |

FOREIGN PATENT DOCUMENTS

| | | |
|---|---|---|
| JP | 11-331237 | 11/1999 |
| JP | 2000-206452 | 7/2000 |
| JP | 2002-064523 | 2/2002 |

OTHER PUBLICATIONS

U.S. Appl. No. 10/298,520, filed by H. Arita on Nov. 19, 2002.
IEEE Standards for Local and Metropolitan Area Networks: Virtual Bridged Local Area Networks, pp. 62-72.

* cited by examiner

*Primary Examiner*—William C. Vaughn, Jr.
*Assistant Examiner*—Mohamed Ibrahim
(74) *Attorney, Agent, or Firm*—Mattingly, Stanger, Malur & Brundidge, P.C.

(57) ABSTRACT

A packet communication apparatus capable of performing packet conversion at high speed for packet transfer or packet transmission/reception has: a packet conversion unit for performing packet conversion for a reception packet received at a plurality of communication units and for a transmission packet to be transmitted from the plurality of communication units; and a transfer control unit for outputting, when the reception packet received by the communication unit is judged as a the transfer packet, the reception packet to a transfer buffer, for outputting the transmission packet to the communication unit corresponding to the communication object at a destination of the transmission packet generated by a packet generating and processing unit, and for outputting the transfer packet to the communication unit corresponding to the communication object at a destination of the transfer packet stored in the transfer buffer.

20 Claims, 25 Drawing Sheets

FIG.7

CONTENTS OF REGISTER 230

| INDEX | NAME | REGISTER CONTENTS | SETTING CONTENTS |
|---|---|---|---|
| 1. | R2301 | FOR MAC ADDRESS NOT REGISTERED IN CAM | RECEIVE, TRANSFER, RECEIVE & TRANSFER |
| 2. | R2310 | CONVERSION MODE FOR TRANSFER PACKET | Qtag INSERT, DELETE, NO INSERTION OR DELETION |
| 3. | R2311 | Qtag VALUE TO BE INSERTED | 0x8100 0000-0x8100 FFFF |
| 4. | R2312 | Qtag FRAME CODE | 0x8100 |

FIG.8

| INDEX | MAC ADDRESS | TRANSFER/TAKE | WORK |
|---|---|---|---|
| 0 | 00.01.02.03.04.05 | TRANSFER | |
| 1 | 01.02.03.04.05.06 | RECEIVE & TRANSFER | |
| ⋮ | ⋮ | ⋮ | ⋮ |
| N | 00.11.22.33.44.55 | RECEIVE | |

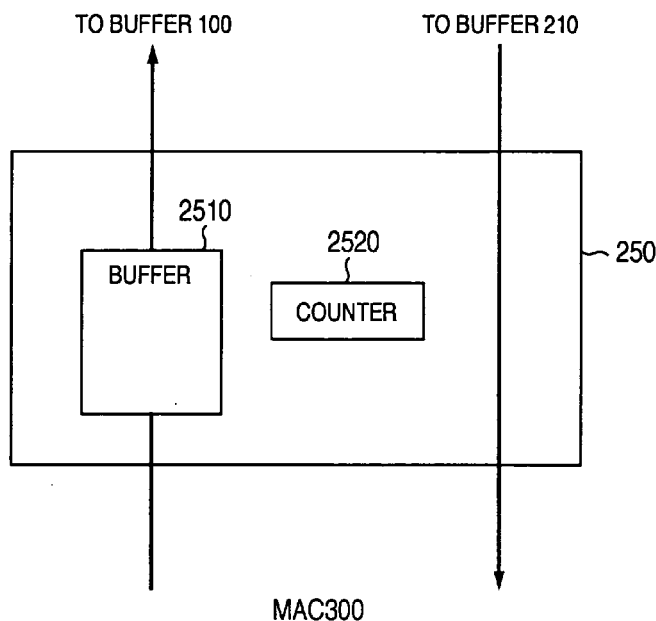

FIG.20

CONTENTS OF REGISTER 230

| INDEX | NAME | REGISTER CONTENTS | SETTING CONTENTS |
|---|---|---|---|
| 1. | R2301 | FOR MAC ADDRESS NOT REGISTERED IN CAM | RECEIVE, TRANSFER, RECEIVE & TRANSFER |
| 2. | R2310 | TRANSFER PACKET CONVERSION MODE (DEFAULT) | Qtag INSERT, DELETE, NO INSERTION OR DELETION |
| 3. | R2311 | DEFAULT QTAG VALUE TO BE INSERTED | 0x8100 0000-0x8100 FFFF |
| 4. | R2312 | Qtag FRAME CODE | 0x8100 |
| 5. | R2313 | MAC ADDRESS TO BE USED FOR TRANSFER PACKET CONVERSION MODE | SOURCE, DESTINATION |

FIG.21

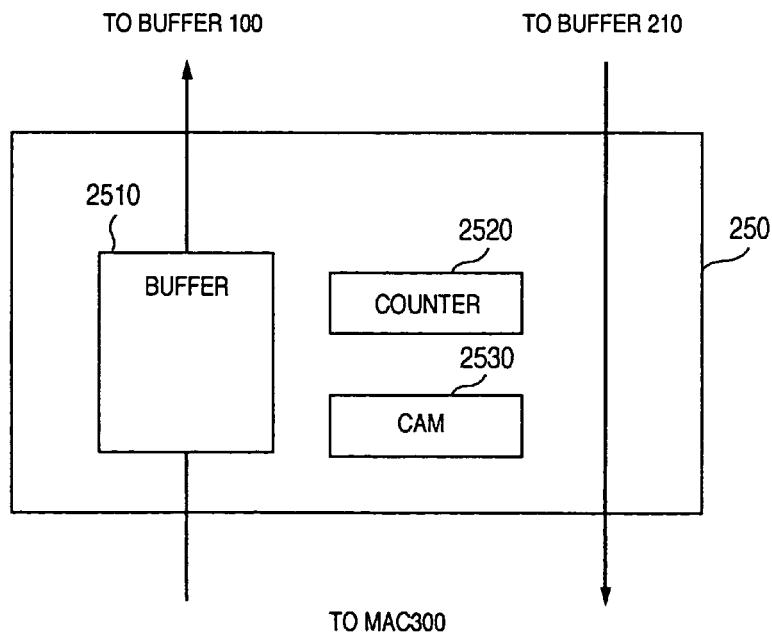

FIG.22

| INDEX | MAC ADDRESS | PACKET CONVERSION INFORMATION | Qtag INFORMATION WORK | | WORK |
|---|---|---|---|---|---|
| | | | V | Qtag VALUE | |
| 0 | 00.01.02.03.04.05 | INSERT QTAG | 1 | 0x8100 2000 | |
| 1 | 01.02.03.04.05.06 | DELETE QTAG | 0 | | |
| ⋮ | ⋮ | ⋮ | ⋮ | ⋮ | ⋮ |
| N | 00.11.22.33.44.55 | WITHOUT CONVERSION | 0 | | |

FIG.23

CONTENTS OF REGISTER 230

| INDEX | NAME | REGISTER CONTENTS | SETTING CONTENTS |
|---|---|---|---|
| 1. | R2301 | FOR MAC ADDRESS NOT REGISTERED IN CAM | RECEIVE, TRANSFER, RECEIVE & TRANSFER |
| 2. | R2310 | SENDING PACKET CONVERSION MODE (DEFAULT) | Qtag INSERT, DELETE, NO INSERTION OR DELETION |
| 3. | R2311 | INSERTION Qtag VALUE (DEFAULT) | 0x8100 0000-0x8100 FFFF |
| 4. | R2312 | Qtag FRAME CODE | 0x8100 |
| 5. | R2313 | MAC ADDRESS USED FOR SENDING PACKET CONVERSION MODE JUDGEMENT | SOURCE, DESTINATION |
| 6. | R2314 | RECEIVING RECEIVING PACKET CONVERSION MODE (DEFAULT) | Qtag DELETE, WITHOUT INSERT OR DELETE |
| 7. | R2315 | MAC ADDRESS USED FOR RECEIVING PACKET CONVERSION MODE | SOURCE, DESTINATION |

FIG.26

| | RECEIVED PACKET CONVERSION MODE | |
|---|---|---|
| | BASIC PACKET TAKING MODE | NO CONVERSION TRANSFER MODE |
| RECEIVED PACKET — BASIC PACKET | NO CONVERSION TRANSFER | NO CONVERSION TRANSFER |
| RECEIVED PACKET — TAGGED PACKET | CONVERT INTO GENERAL PACKET AND TRANSFER | NO CONVERSION TRANSFER |

FIG.27

| | | SENDING PACKET CONVERSION MODE | | |
|---|---|---|---|---|
| | | BASIC PACKET SENDING MODE | TAGGED PACKET SENDING MODE | SENDING MODE WITHOUT CONVERSION |
| PACKET TO BE SENT FROM MAC 300 | BASIC PACKET | NO CONVERSION TRANSFER | CONVERT INTO TAGGED PACKET AND TRANSFER | NO CONVERSION TRANSFER |
| | TAGGED PACKET | CONVERT INTO BASIC PACKET AND TRANSFER | NO CONVERSION TRANSFER | NO CONVERSION TRANSFER |

PACKET (BASIC PACKET) CONFORMING WITH IEEE 802.3

PACKET (PACKET WITH Qtag) CONFORMING WITH IEEE 802.1Q

- PR : PReamble
- SFD : Start Frame Delimiter
- DA : Destination Address
- SA : Source Address
- L/T : Length or Type
- FCS : Frame Check Sequence
- TCI : Tag Control Information

FROM IEEE
STANDARDS 802.1Q

PACKET COMMUNICATION APPARATUS

CROSS-REFERENCE TO RELATED APPLICATION

This invention relates to a patent application Ser. No. 10/298,520 entitled "Packet Communication Device, Packet Communication System, Packet Communication Module, Data Processor, and Data Transfer System" filed on Nov. 19, 2002 by H. Arita.

BACKGROUND OF THE INVENTION

The present invention relates to a packet communication apparatus having a system LSI mounted with a CPU and a plurality of communication means capable of transmitting/receiving a packet and automatically transferring a packet among the plurality of communication means by using hardware.

DESCRIPTION OF THE RELATED ART

A communication apparatus using a packet is known which is used as an IP phone for exchanging voice data by using Ethernet (registered trademark, same in the following) on the base of an Internet Protocol (IP). The packet communication apparatus of this type is constituted of a CPU, two Ethernet controllers, a transfer control circuit, a memory and the like. One Ethernet controller is connected to a hub (HUB) via a Ethernet, and the other Ethernet controller is connected to a personal computer (PC) via another Ethernet to connect HUB and PC via the communication apparatus. This method of reducing the number of Ethernet cables to HUB has been adopted heretofore.

In this packet communication apparatus, if the destination of a packet received from each Ethernet cable is the communication apparatus, the received packet is directly processed. If the packet has a different destination, this destination is checked and when necessary the packet is transferred to the other Ethernet cable. This packet communication apparatus can therefore transfer a packet of a mail or Internet information transmitted from HUB and destined for a PC to the PC side Ethernet cable, transfer a packet of a mail or an Internet access transmitted from PC to a HUB side, or realize a phone function by transmitting voices input from a handset as voice data and outputting received voice data from a speaker as voices.

With the IP phone, only about one packet per 10 ms to 20 ms is transmitted/received and the number of packets to be transmitted/received is small. There is therefore no problem of transferring packets from a PC side which has a relatively low real time nature. However, in order to realize smooth speech between IP phones, packets of voice data are required to be passed to LAN or WAN with a priority over other data packets because the voice data requires a relatively high real time nature.

As a packet priority communication for Ethernet of Local Area Network (LAN), a priority control scheme at an Internet Protocol (IP) level or third network layer and a priority control scheme at a Media Access Control (MAC) level or second data link layer are known according to the Open Systems Interconnection (OSI) reference model which is the international standards of networks.

The priority control scheme at the IP level can be used by Ethernet of LAN as well as Asynchronous Transfer Mode (ATM) for a Wide Area Network (WAN), and a frame relay.

In order to realize the priority control at the IP level for Ethernet of LAN, the protocol process at the IP layer one layer upper than the MAC layer is required so that the process becomes complicated.

The IEEE 802 Committee has stipulated the standard IEEE 802.1p which can realize the priority control at the second layer. IEEE 802.1p has been devised recently to IEEE 802.1Q which supports a virtual LAN dealing one LAN as a collection of a plurality of LAN's.

An Ethernet packet stipulated in IEEE 802.1Q has a packet length longer by 4 bytes than a basic Ethernet packet stipulated in IEEE 802.3 because priority information is added. Therefore, a packet communication apparatus capable of transmitting/receiving only a basic Ethernet packet cannot receive a packet with priority information. IEEE 802.1Q stipulates that HUB transfers a packet by converting it into a proper packet in accordance with each communication apparatus.

HUB which supports packet conversion makes setting of each port to which an Ethernet cable is connected. If a packet of voice data with priority information stipulated in IEEE 802.1Q is used for real time communication for IP phones, this packet is sent from HUB connected to an IP phone to another IP phone and also to PC connected to HUB via the IP phone.

If PC connected to the IP phone cannot receive a packet with priority information, HUB is required to convert the packet with priority information into a packet stipulated in IEEE 802.3.

There is a method of making CPU in an IP phone convert a packet with priority information to be transferred to PC into a packet in conformity with IEEE 802.3.

Packet conversion at HUB requires manual settings of HUB which take a labor. In addition, a packet transmitted from an IP phone or PC is converted by HUB into a packet having the same priority.

With the advent of recent broadband of the Internet, LAN and WAN are rapidly increasing their speed and the number of packets to be received at PC is also increasing. In addition to Internet services of PC which impose no limit of an access time, such as e-mails and home page accesses, Internet services which require a communication real time nature, such as video and Internet television relay called streaming, are increasing. Packets having various priority degrees are transferred over the net.

Under such environments, as the number of packets to be transferred to PC increases, a packet communication apparatus is required to have a high transfer process speed. This requirement is more severe than the improvement on the CPU processing capacity.

With the packet conversion by CPU, as an overhead of a CPU process and the number of packets to the transferred to PC are increased, a CPU load increases and the packet conversion process is delayed. A flow control and dropping transfer packets may therefore occur.

In the case of an IP phone described above, if a CPU load is increased by packet transfer, the voice process executed by CPU is delayed. Services of IP phones are therefore degraded. Occurrence of a flow control temporarily stops packet transmission from HUB to an IP phone so that the voice data packet does not arrive at the IP phone. If a transfer packet is dropped, the dropped packet is required to be transmitted again so that the Ethernet transfer efficiency lowers.

Furthermore, if an IP video phone is used as the packet communication apparatus in place of an IP phone, CPU is required to perform a heavy video process in addition to a voice process. A CPU load increases further so that the Ethernet transfer efficiency is degraded greatly.

If a conventionally used communication program is used as a communication program to be executed by CPU of the packet communication apparatus, this communication program cannot transmit/receive a packet stipulated in IEEE 802.1Q. Therefore, the program is required to be altered and an overhead of a transmission/reception process increases. As the number of packets to be processed by the packet communication apparatus increases, a CPU load increases so that a flow control, dropping received packets, and a transmission delay of a packet may occur. As a flow control occurs, transmission of a packet from HUB to PC is temporarily stopped so that a process performance of the packet communication apparatus and the Ethernet communication efficiency on the PC side are degraded.

SUMMARY OF THE INVENTION

It is an object of the present invention to provide a packet communication apparatus and a packet communication module capable of automatically judging whether packet conversion is necessary or not and performing packet conversion for transfer or transmission/reception at high speed.

A packet communication apparatus of this invention comprises: at least two communication means for performing packet communication among a plurality of communication objects by using a packet (new standard packet) with priority information and a packet (old standard packet) without priority information; packet transfer means for transferring a packet among the communication means; calculation means for performing a process requiring a real time nature such as multimedia; and storage means for storing at least one program to be executed by the calculation means and data and storing a packet to be transmitted/received by the calculation means, wherein when the communication object cannot receive the new standard packet, the packet transfer means converts the new standard packet into the old standard packet and transferring the old standard packet to the communication object.

The packet communication apparatus further comprises at least one control register capable of being set with a presence/absence of packet conversion by the calculation means, wherein if it is judged that the communication object cannot receive the packet with priority information, the control register is changed from a new standard compatible mode to an old standard compatible mode in a closed manner within the apparatus in accordance with the program stored in the storage means.

The packet communication apparatus further comprises a buffer for temporarily storing a packet to be transferred, wherein conversion from the new standard packet to the old standard packet is realized by dropping only the priority information without inputting the priority information into the buffer.

The packet communication apparatus further comprises a content addressable memory or a RAM table for storing information on whether each of the communication objects corresponds to either the new standard packet or the old standard packet, wherein packet information basing upon the stored information is performed in a closed manner within the packet communication apparatus.

In the packet communication apparatus constructed as above, the program to be executed by the communication means checks whether the communication object connected to the packet communication apparatus can receive the new standard packet. If the communication object is compatible with the old standard packet, this information is set to the control register or content addressable memory (RAM table) in the packet communication apparatus. In accordance with the set information, the transfer means performs packet conversion. Packet conversion can be performed in a closed manner within the packet communication apparatus, without any load upon the communication means.

Also in the packet communication apparatus, if the program stored in the storage means to be executed by the communication means cannot process the new standard packet, the transfer means converts the new standard packet into the old standard packet, writes the old standard packet in the storage medium, and converts the old standard packet in the storage means into the new standard packet to be transmitted from the communication means.

The packet communication apparatus further comprises a control register capable of being set with a presence/absence of packet conversion by the calculation means, wherein if a program to be executed by the calculation means cannot process the packet with priority information, the control register is changed from a new standard compatible mode to an old standard compatible mode in a closed manner within the apparatus in accordance with the same program as the program stored in the storage means or a different program.

The packet communication apparatus further comprises a register capable of being set with priority information by the calculation means, the priority information being inserted when a transmission packet stored in the storage means is converted from the old standard packet into the new standard packet, wherein if a program to be executed by the calculation means cannot process the packet with priority information, setting the priority information to the register is performed in a closed manner in the apparatus in accordance with the same program as the program stored in the storage means or a different program.

In the packet conversion apparatus, if a program stored in the storage means cannot process the new standard packet, the control register is set in accordance with the same program as the program stored in the storage means or a different program. The new standard packet received by the packet conversion apparatus is therefore converted into the old standard packet which is then stored in the storage means. Similarly, the resister for storing priority information is set in accordance with a program stored in the storage means. In accordance with the register, the old standard packet stored in the storage means is converted into the new standard packet with priority information and transmitted. Similarly, packet conversion can be performed in a closed manner within the packet conversion apparatus without any load on the calculation means.

BRIEF DESCRIPTION OF THE DRAWINGS

FIG. 7 is a diagram showing the structure of registers according to the invention.

FIG. 8 is a diagram showing the structure of CAM according to the invention.

FIG. 9 is a diagram showing the structure of a packet conversion circuit according to the invention.

FIG. 10 is a diagram illustrating packet conversion conditions according to the invention.

FIG. 20 is a block diagram showing the structure of a packet conversion circuit according to the invention.

FIG. 21 is a diagram illustrating the structure of registers according to the invention.

FIG. 22 is a flow chart illustrating a packet transmission/reception/transfer process according to the invention.

FIG. 23 is a diagram illustrating packet conversion conditions for packet reception according to the invention.

FIG. 26 is a diagram illustrating processing a packet transmitted from an Ethernet MAC for packet transmission.

FIG. 27 is a diagram illustrating processing a packet transmitted from an Ethernet MAC for packet transmission.

DESCRIPTION OF THE EMBODIMENTS

Embodiments of the invention will be described with reference to the accompanying drawings. The main points of the invention will be described with reference to FIGS. 1, 6, 8 and 30.

Figure 1:
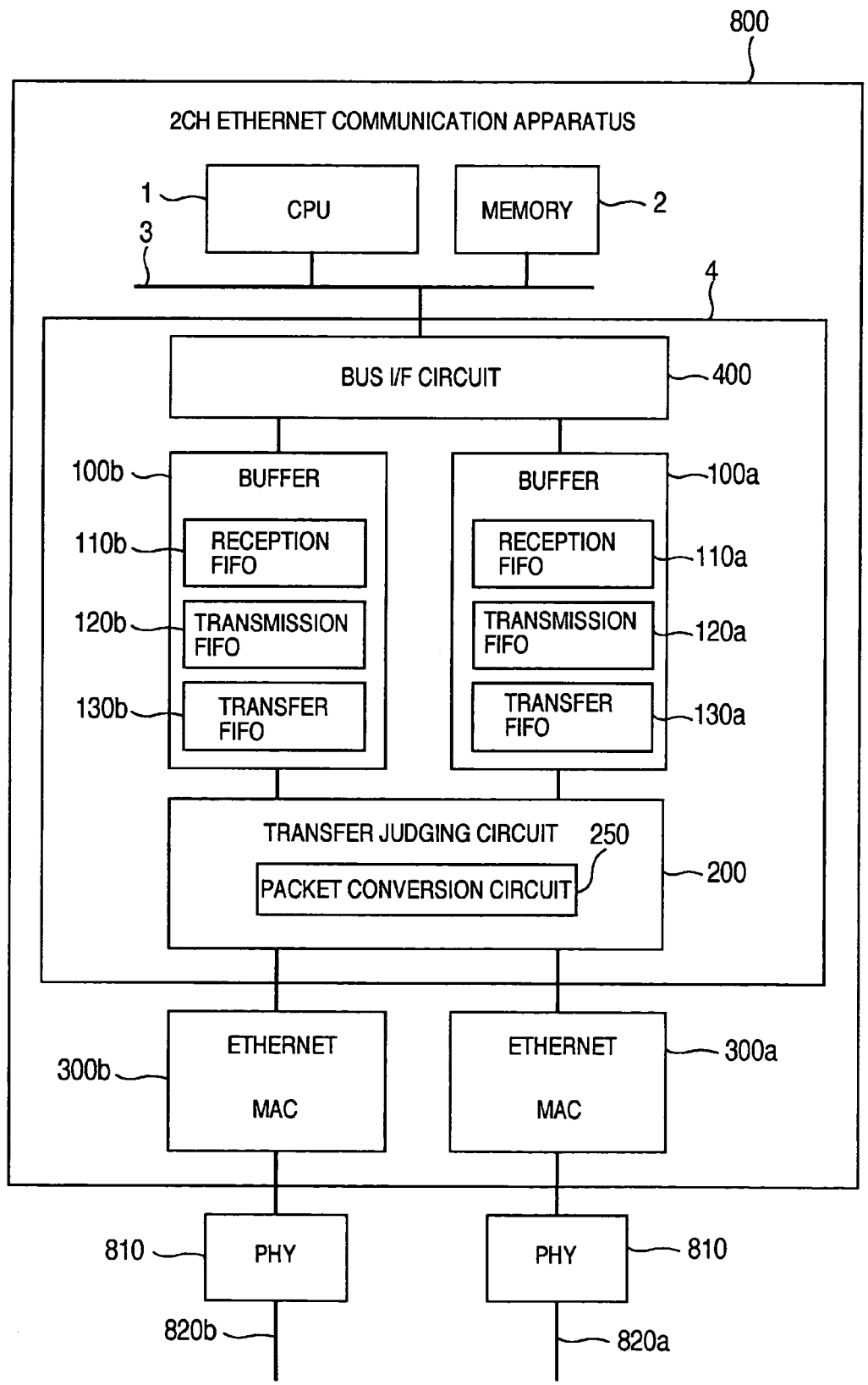
FIG. 1 is a block diagram showing the structure of a two-channel Ethernet communication apparatus according to an embodiment of the invention.
Figure 30:
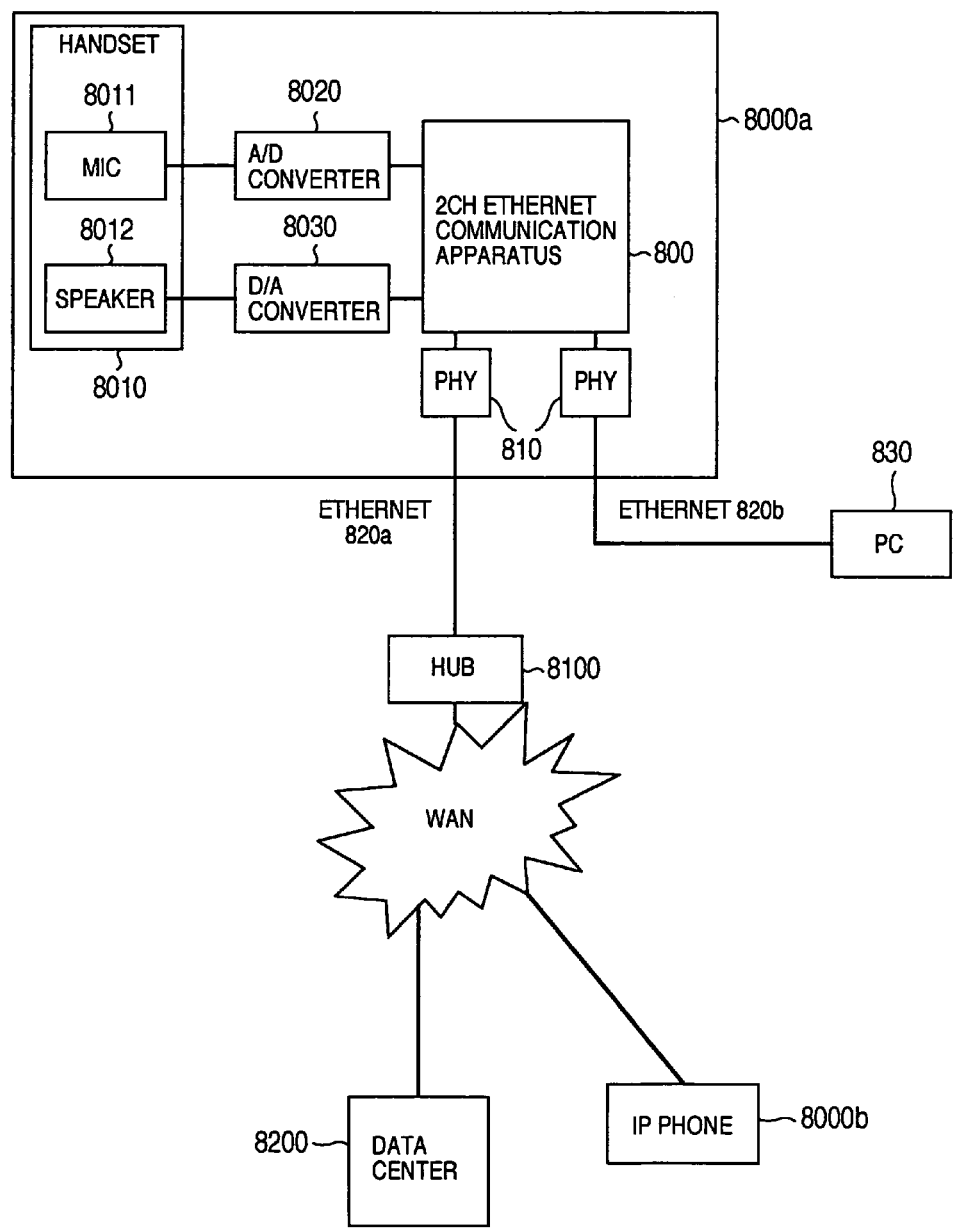
FIG. 30 is a block diagram showing a two-channel Ethernet communication apparatus of the invention applied to an IP phone system.
Figure 31:
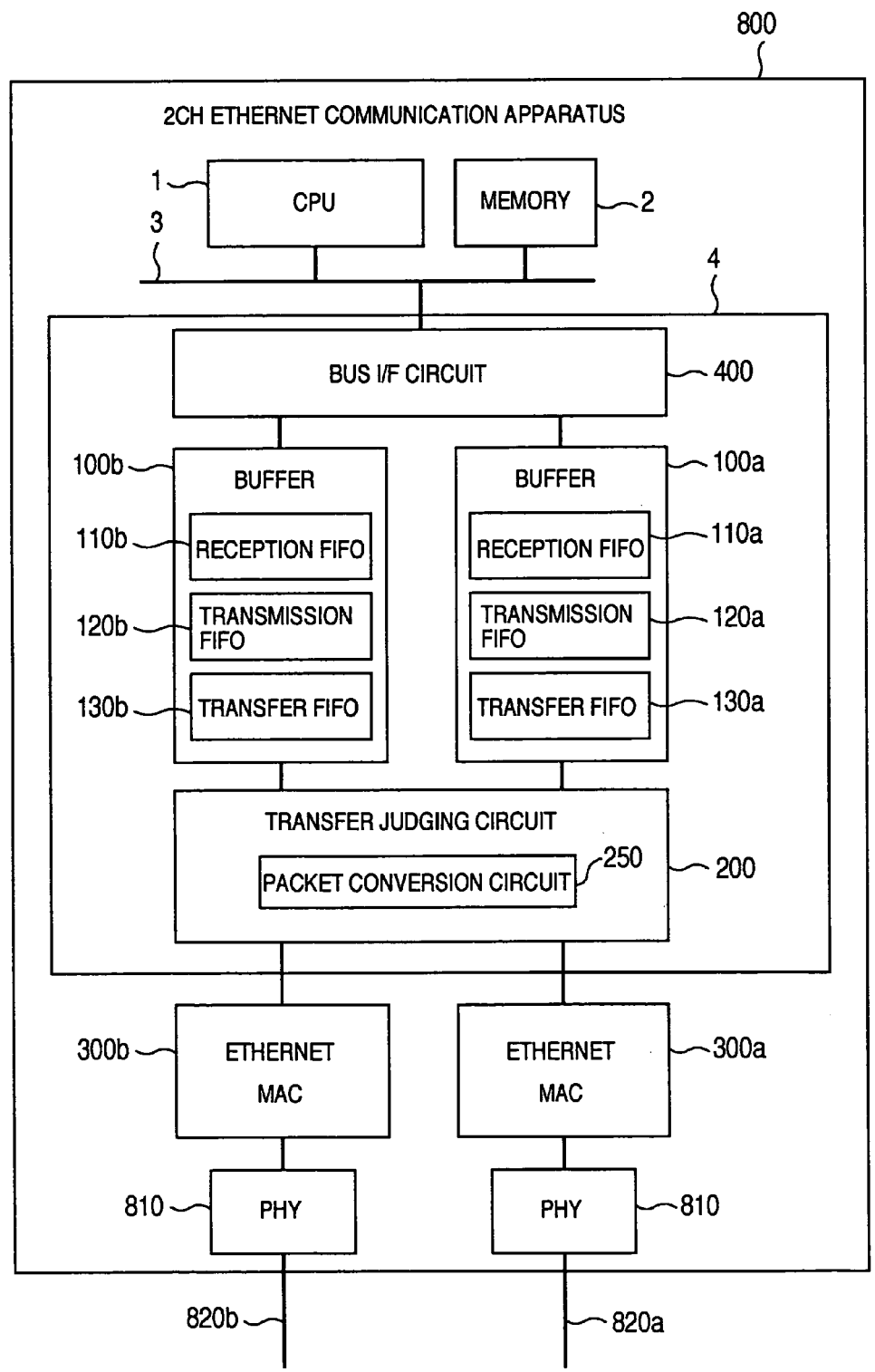
FIG. 31 is a block diagram showing the structure of a two-channel Ethernet communication apparatus according to another embodiment of the invention.

FIG. 1 is a block diagram showing the structure of a packet communication apparatus according to an embodiment of the invention, and FIG. 30 is a block diagram showing a packet communication system in which the packet communication apparatus of the invention is applied to an IP phone. Referring to FIG. 30, speech between IP phones 8000 is realized by transferring voice packets obtained by converting voices into Ethernet packets. A two-channel Ethernet communication apparatus (2 Channel Ethernet) 800 which is a packet communication apparatus built in the IP phone 8000 is provided with communication paths (communication means) of two channels. The communication paths of two channels are connected to Ethernet cables 820a and 820b via physical layer transceivers (PHY) 810a and 810b. The Ethernet cable 820a is connected to a hub apparatus (HUB) 8100 connected to a wide area network (WAN) such as the Internet and an intranet on the upstream side, and connected via HUB 8100 and WAN to an IP phone 8000b and a data center 8200 having home page data on the downstream side. The Ethernet cable 820b is connected to a PC 830 on the downstream side which serves as a downstream Ethernet communication apparatus. Each Ethernet cable 820a, 820b can operate independently. Communication between the IP phones 8000a and 8000b and between PC 830 and data center 8200 can be realized by transferring Ethernet packets (hereinafter simply called packets) conforming to the standards IEEE 802.3 and 802.1Q over HUB 8100, IP phone 8000a and PC 830. In this case, the two-channel Ethernet communication apparatus 800 in the IP phone 8000a has a function of transmitting/receiving packets and transferring packets between the Ethernet cables 820a and 820b, so that communication is possible between HUB 8100 and PC 830 via the two-channel communication apparatus 800.

The IP phone 8000a has a function of transferring packets between the Ethernet cables 820a and 820b so that PC 830 can transfer data packets such as home page data to and from the data center 8200 via the IP phone 8000a and HUB 8100.

WAN is a best effort type and when traffics are congested, a packet transmission time becomes long. A delay in the arrival of voice packets to be transferred to and from the IP phone may cause pauses and noises in partner voices received from the handset and the voices are difficult to be listened at. Voice packets are flowed in WAN with a priority over other packets by using packets with priority information conforming with the standard IEEE 802.1Q shown in FIG. 28B, so that the real time nature of voice packet transfer can be improved and speech without any stress can be realized. As compared to a basic Ethernet packet conforming with the standard IEEE 802.3 shown in FIG. 28A, the packet with priority information is longer by 4 bytes. Many Ethernet communication apparatuses can transmit/receive this packet with priority information. It can be easily anticipated that PC 830 on the upstream side of the IP phone cannot receive this packet.

Figure 28A:
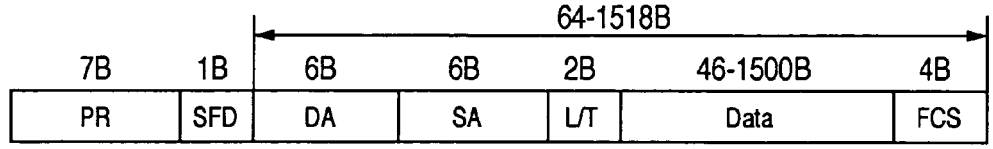
FIGS. 28A and 28B are diagrams showing the frame structures of a basic packet and a tagged packet according to the invention.
Figure 28B:
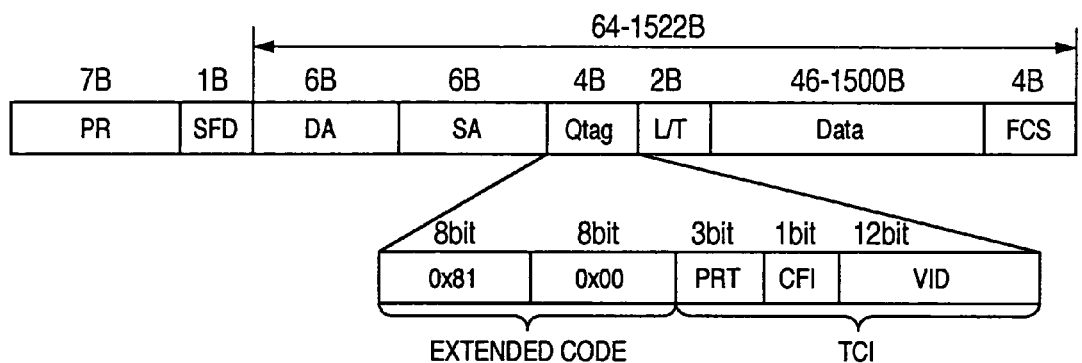
Figure 29:
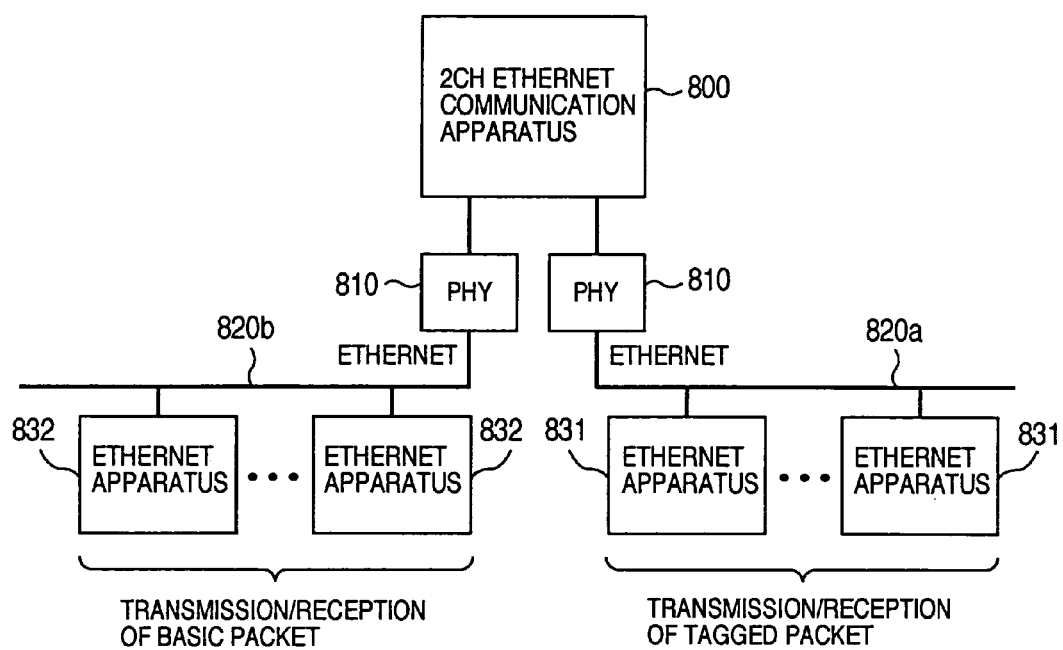
FIG. 29 is a block diagram showing a communication network using a two-channel Ethernet communication apparatus according to the invention.

To avoid this, the two-channel Ethernet communication apparatus 800 built in the IP phone 8000a is provided with a mechanism of converting the packet with priority information shown in FIG. 28B into a basic packet shown in FIG. 28A when the packet received from HUB 8100 is transferred to PC 830.

The two-channel Ethernet communication apparatus 800 has means for checking whether PC 830 can receive the packet with priority information. More specifically, the two-channel Ethernet communication apparatus 800 transmits a packet with priority information to PC 830 on the downstream side. If PC 830 can transmit/receive a packet with priority information, it sends back a response to the received packet with priority information. The two-channel Ethernet communication apparatus 800 judges that PC 830 can transmit/receive a packet with priority information, if there is a response from the downstream device (PC 830). On the other hand, if there is no response, the two-channel Ethernet communication apparatus 800 judges that PC 830 cannot transmit/receive a packet with priority information and conversion into a basic packet is necessary.

If packet conversion is necessary, the two-channel Ethernet communication apparatus 800 itself converts the packet with priority information received from HUB 8100 into a basic packet and transfers it to PC 830.

Figure 6:
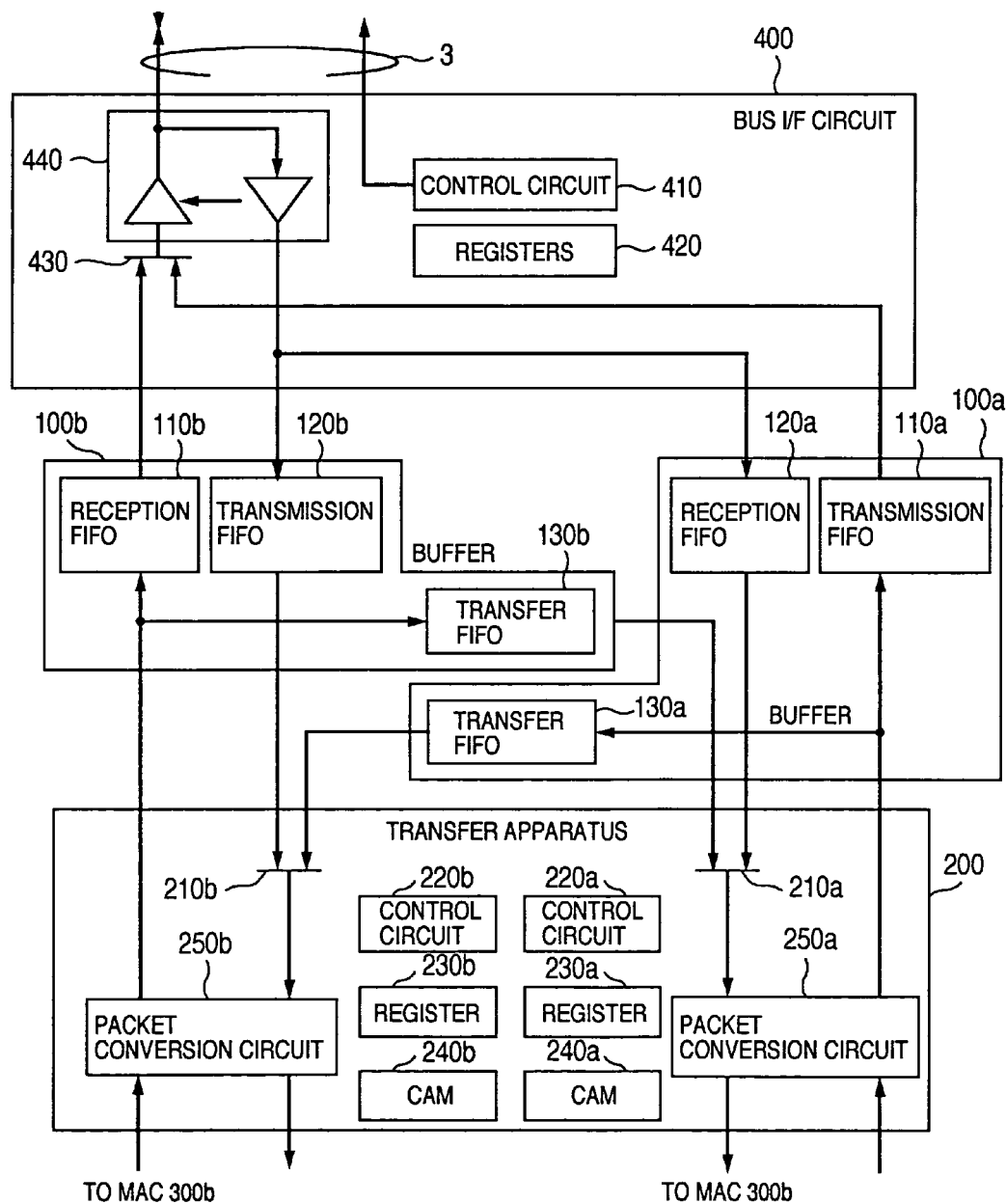
FIG. 6 is a block diagram showing the structure of a bus I/F circuit, buffers and a transfer judging circuit according to the invention.

As shown in FIG. 1, the two-channel Ethernet communication apparatus 800 is constituted of a CPU 1, a memory 2, a two-channel Ethernet communication module 4, and a bus 3 interconnecting these components. The two-channel Ethernet communication module 4 is constituted of a bus interface (I/F) circuit 400, two buffers 100a and 100b, two media access control circuits (MAC) 300a and 300b and a transfer judging circuit 200 having a packet conversion circuit 250. MAC 300a is connected via PHY 810a to the Ethernet cable 820a and MAC 300b is connected via PHY 810b to the Ethernet cable 820b. The buffer 100 is constituted of a transmission FIFO 110, a reception FIFO 120 and a transfer FIFO 130. The transfer FIFO 130 is used for transferring packets between MAC's 300a and 300b. As shown in FIG. 6, in order to realize bidirectional packet conversion, the transfer judging circuit 200 has two sets of a selector 210, a control circuit 220, a register 230, a CAM 240 and a packet conversion circuit 250, which are connected to a bus I/F circuit 400, the reception FIFO 110, transmission FIFO 120 and transfer FIFO 130 in the buffer 100 as shown in FIG. 6.

The packet conversion circuit 250 converts the packet with priority information into a basic packet or vice versa in accordance with a mode set in the register 230 and the contents of CAM 240. Conversion of a packet to be transferred is performed in a closed manner within the two-channel Ethernet communication module. The contents set to the register 230 and CAM 240 as the default values when a power is turned on indicate that the packet conversion is not performed. In accordance with a program (refer to FIG. 5) stored in the memory 2 and executed by CPU 1, it is judged whether the downstream device can transmit/receive a packet with priority information and settings of the register 230 and CAM 240 are performed. These operations can be performed in a closed manner within the two-channel Ethernet communication apparatus 800 without any external specific circuit.

As shown in FIG. 28, a difference between a packet with priority information and a basic packet is a Qtag of 4 bytes. The packet conversion circuit 250 drops only the Qtag of a packet with priority information received by MAC 300 without loading it in the transfer FIFO 130 to realize conversion into a basic packet.

As described earlier, CAM 240 is constituted of a content addressable memory (or a RAM table) such as shown in FIG. 8. CAM 240 stores information on whether a packet with priority information is converted into a basic packet for transfer, this information being provided for the MAC address of each downstream device. In accordance with a destination MAC address (DA field value in FIG. 28) of a packet received at MAC 300, the packet conversion circuit 250 checks CAM 240 to decide whether conversion is to be performed or not, and if necessary, conversion is performed.

The frame structures of a basic packet (FIG. 28A) and a tagged packet (FIG. 28B) will be described.

As shown in FIG. 28B, the tagged packet is constituted of: a preamble (PR) of 7 bytes indicating the packet start; a start frame delimiter (SFD) of 1 byte; and six frames including: a destination address (DA) frame of 6 bytes storing a destination MAC address; a source address (SA) frame of 6 bytes storing a source MAC address; a Qtag (IEEE 802.1Q tag) frame of 4 bytes storing Qtag information; a data (Data) frame of 42 to 1500 bytes storing data; a length/type (L/T) frame of 2 bytes storing a data length or data type in the Data frame; and a frame check sequence (FCS) frame of 4 bytes storing a code indicating whether the packet was correctly received. This tagged packet has a packet length of 64 bytes to 1522 bytes.

The Qtag frame is constituted of a two-byte code 0x8100 (0x is a symbol for hexadecimal) indicating the Qtag stipulated in IEEE 802.1Q and two-byte tag control information (TCI) storing tag control information. TCI stores priority order information and a LAN number to be used by a virtual local area network (LAN). The detailed information on TCI is described in the standard IEEE 802.1Q. In this specification, the details of TCI are omitted because they are not relevant to the invention.

The basic packet removing the Qtag frame from the tagged packet is constituted of: a PR of 7 bytes; an SFD of 1 byte; and five frames: including a DA frame of 6 bytes; an SA frame of 6 bytes; an L/T frame of 2 bytes; a Data frame of 46 to 1500 bytes and an FCS frame of 4 bytes. The length of the basic packet is 64 bytes to 1518 bytes. A difference between the tagged packet and basic packet resides in only the presence/absence of the Qtag frame. The Data frame of the basic packet is 46 bytes which is longer than by 4 bytes from that of the tagged packet, because the packet length is defined to be 64 bytes or longer by the Ethernet Standard IEEE 802.3.

The PR, SFD and FCS frames are used for correctly transmitting/receiving a packet on the Ethernet cable and are not relevant to the Ethernet communication contents. MAC's 300a and 300b add these frames when a packet is transmitted, and separate them when a packet is received.

The specific structure of the two-channel Ethernet communication apparatus 800 will be described.

As shown in FIG. 1, the two-channel Ethernet communication apparatus 800 is constituted of: a CPU 1 which is a packet generating and processing means for generating a packet to be transmitted by each of a plurality of communication means and processing the packet received by each of the plurality of communication means; a memory 2; a two-channel Ethernet communication module (hereinafter called a two-channel communication module) 4; and a bus 3 interconnecting these components. The two-channel communication module 4 is constituted of: a bus interface (I/F) circuit 400; two buffers 100a and 100b; a plurality of communication means, in this embodiment, two media access control circuits (MAC) 300a and 300b; and a transfer judging circuit 200. MAC 300a is connected via PHY 810a and Ethernet cable 820a to a communication apparatus 830a to transmit/receive a packet to/from the communication apparatus 830a. Namely, MAC 300a is structured as communication means for transmitting/receiving a packet to/from the communication apparatus 830a as a communication object via PHY 810a and Ethernet cable 820a.

MAC 300b is connected via PHY 810b and Ethernet cable 820b to a communication apparatus 830b to transmit/receive a packet to/from the communication apparatus 830b. Namely, MAC 300b is structured as communication means for transmitting/receiving a packet to/from the communication apparatus 830b as a communication object via PHY 810b and Ethernet cable 820b.

Packets to be transmitted/received by the plurality of communication means, MAC's 300a and 300b, are classified into three packets, transmission, reception and transfer packets. In order to avoid confusion, transmission/reception of a packet by the two-channel Ethernet communication apparatus 800 and two-channel communication module 4 is called transmission (transmit), reception (receive) or transmission/reception (transmit/receive), whereas transmission/reception of a packet by the MAC's 300a and 300b is called sending (send), receiving (receive) or transfer.

Figure 5:
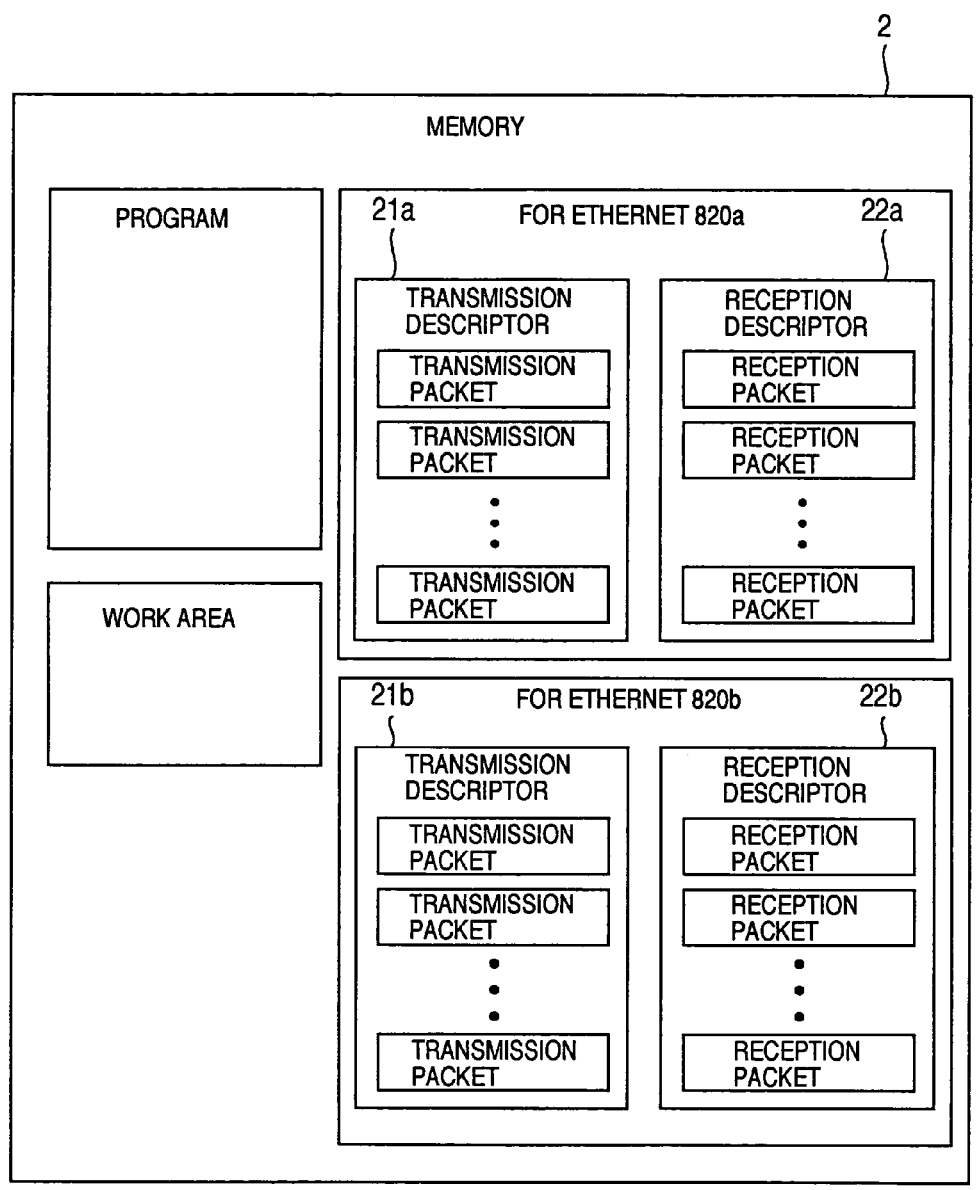
FIG. 5 is a block diagram showing the structure of a memory according to the invention.

As showing in FIG. 5, the memory 2 is constituted of: a program 20a to be executed by CPU 1; a work area 20b for storing the execution state of the program 20a; a transmission descriptor 21a (21b) for storing a packet which is transmitted by the 2-channel Ethernet communication apparatus 800 to the Ethernet cable 820a (820b); and a reception descriptor 22a (22b) for storing a packet received from the Ethernet cable 820a (820b).

CPU 1 accesses via the bus 3 the memory 2 and two-channel Ethernet communication apparatus 4, executes the program 20a written in the memory 2, accesses the status (register) of the two-channel Ethernet communication apparatus 4, reads and processes the packet received and stored in the reception descriptor 22a, 22b in the memory 2, generates a transmission packet, and writes the generated transmission packet in the transmission descriptor 21a, 21b in the memory 2.

CPU 1 is structured as a packet generating and processing means for generating transmission packets to be sent by MAC 300a, 300b and processing packets received by MAC 300a, 300b.

FIG. 6 shows a specific structure of the bus I/F circuit 400, buffer 100a, 100b and transfer judging circuit 200. The bus I/F circuit 400 is constituted of an input/output buffer 440, a selector 430, a control circuit 410 for controlling the input/output buffer 440 and selector 430, and registers 420. The selector 430 selects a packet output from a reception FIFO (First In First Out) 110a or 110b of a buffer 100a or 100b, and outputs the selected packet to the input/output buffer 440. The input/output buffer 440 outputs a packet received from the bus 3 to transmission FIFO's 120a and 120b of the buffers 100a and 100b. The control circuit 410 monitors the transmission descriptors 21a and 21b in the memory 2. When a packet is registered in the transmission descriptor 21a, 21b by CPU 1, the control circuit 410 sets an input state to the input/output buffer 440 to transfer a packet registered in the transmission descriptor 21a (21b) to the transmission FIFO 120a (120b) via the bus 3.

Similarly, when a packet is written in the reception FIFO 110a, 110b, the control circuit 410 sets an output state to the input/output buffer 440 to make the selector 430 select a packet output from the reception FIFO 110a or 110b to transfer the selected packet to the reception descriptor 22a or 22b in the memory 2.

The buffer 100a, 100b has the reception FIFO 110a, 110b for temporarily storing a received packet, the transmission FIFO 120a, 120b for temporarily storing a packet to be transmitted, and transfer FIFO 130a, 130b for transferring a packet to and from MAC 300a, 300b. The transfer FIFO 130a, 130b is structured as a transfer buffer means for storing a transfer packet for information transfer between the communication apparatuses 830a and 830b. The transfer FIFO 130a stores a transfer packet to be transferred from the communication apparatus 830a to the communication apparatus 830b, and the transfer FIFO 130b stores a transfer packet to be transferred from the communication apparatus 830b to the communication apparatus 830a.

The transfer judging circuit 200 is constituted of: selectors 210a and 210b; control circuits 220a and 220b for controlling the buffers 100a and 100b; registers 230a and 230b for storing the state of the transfer judging circuit 200; CAM's (Content Addressable Memories) 240a and 240b structured as transfer packet conversion mode determining means for storing judgment information on whether a packet received by MAC 300a, 300b is to be sent to the two-channel Ethernet communication apparatus 800 or two-channel communication module 4 or whether the packet is sent to the other MAC 300a, 300b and for setting a packet conversion mode in accordance with the communication objects at the source and destination of the transfer packet; the selector 210a selecting a packet from either the transmission FIFO 120a or the transfer FIFO 130b and outputting the selected packet to MAC 300a; the selector 210b selecting a packet from either the transmission FIFO 120b or the transfer FIFO 130a and outputting the selected packet to MAC 300b; and packet conversion circuits 250a and 250b for converting a basic packet into a tagged packet or vice versa in order to transfer the packet received by MAC 300a, 300b.

As shown in FIG. 7, the register 230a, 230b is constituted of four registers R2301, R2310, R2311 and R2312. The register R2301 is used for setting a process (receiving, transfer, receiving and transfer, drop) to be executed when the destination MAC address of a packet received by MAC 300a, 300b is not yet registered in CAM 240a, 240b. The registers R2310, R2311 and R2312 are used for setting data related to packet conversion. The register R2310 is a packet conversion mode register for setting a packet conversion mode (Qtag insert, delete, transfer without inserting or deleting Qtag) to be used when CPU 1 as a packet generation means transfers a packet between MAC's 300a and 300b. The register R2311 is a register settable with a Qtag value by CPU 1 when a Qtag frame with priority information is added to a packet without priority information and transferred to MAC 300. The register R2312 is used for setting a two-byte code for detecting a Qtag frame (in this example, 0x8100: hexadecimal notation). The register R2310 in the register 230a is used for setting transfer from MAC 300a to MAC 300b, and the register R2310 in the register 230b is used for setting transfer from MAC 300b to MAC 300a.

A frame other than a Qtag frame can be inserted or added because a code 0x8100 (hexadecimal notation) representative of the Qtag frame is set to the register R2312 and the code representative of the Qtag frame is set to the register R2311. If only the Qtag is used, 0x8100 in the registers R2311 and R2312 may be replaced with a fixed value and CPU 1 is made not accessible to the value.

CAM 240a, 240b is a special memory called a content addressable memory. As shown in FIG. 8, each entry has a MAC address, corresponding process information including receive, transfer, receive & transfer, and drop, and a work area. As a MAC address is input, the process information in the entry having the same MAC address is output. The work area is used when CPU 1 updates the entry. If there are a plurality of MAC addresses same as the input MAC address, the process information of the entry having the smallest index number is output. CPU 1 sets or updates each entry of CAM 240a, 240b.

CAM 240a, 240b constructed as above is used whether a packet at MAC 300a, 300b is received, transferred, received & transferred, or dropped relative to the packet destination MAC address.

Figure 2:
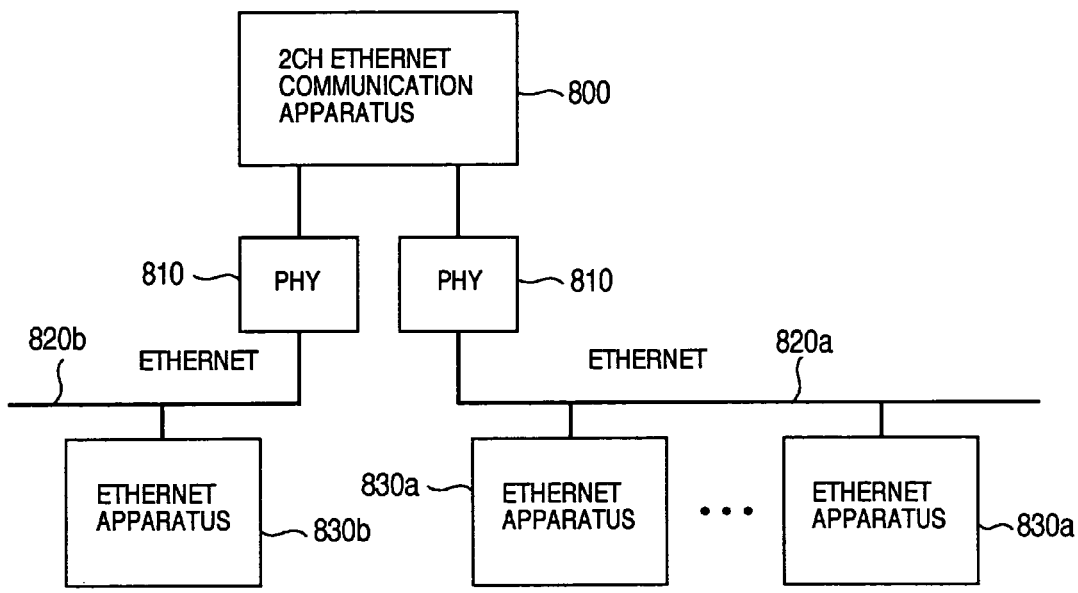
FIG. 2 is a block diagram showing the structure of a communication network using the two-channel Ethernet communication apparatus of this invention.
Figure 3:
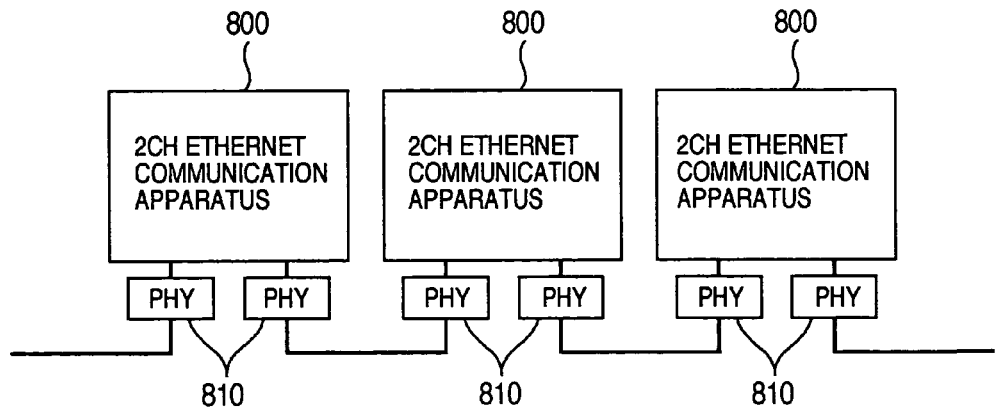
FIG. 3 is a block diagram showing the structure of a system having a plurality of directly connected two-channel Ethernet communication apparatuses of this invention.
Figure 4:
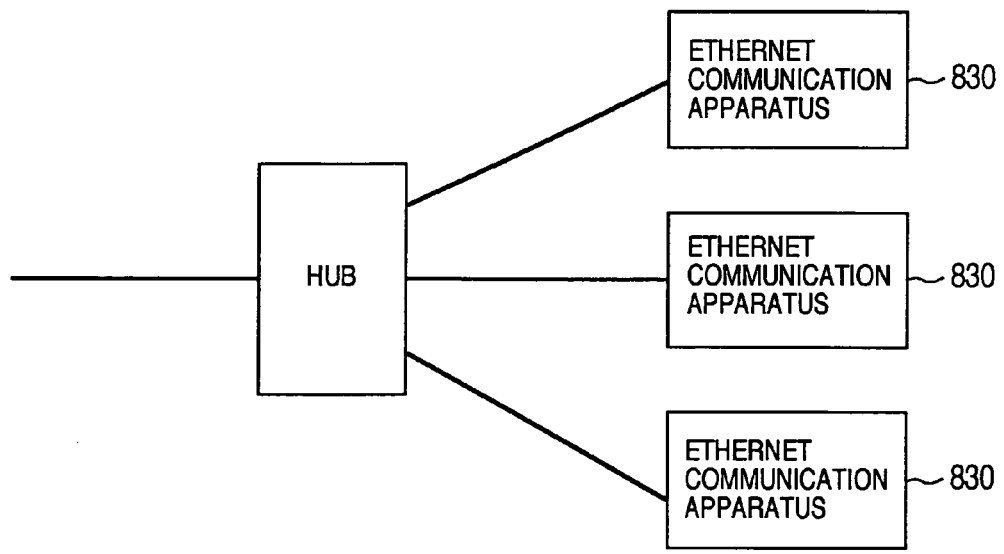
FIG. 4 is a block diagram showing the structure of a system having a plurality of Ethernet communication apparatuses of this invention connected to HUB.

In a communication system shown in FIG. 2, a MAC address unique to each apparatus is set to each of the communication systems 830a and 830b and the two-channel Ethernet communication apparatus 800. Each communication apparatus generates a packet by using the destination MAC address of the apparatus to which the packet is transmitted.

CAM 240a, 240b can set reception/transfer in accordance with the destination MAC address.

For example, when a MAC address of the index 0 is input to the two-channel Ethernet communication apparatus 800, it is judged that this packet is transferred to the communication apparatus 830a or 830b. If a packet has a MAC address corresponding to the index N, it is judged that the packet is received by the two-channel communication apparatus 800. If there is no entry having the same MAC address, the register R2301 determines receive, transfer, receive & transfer, or drop.

In this embodiment, there are two CAM's 240a and 240b to be used for setting receive, transfer, receive & transfer or drop for a packet received at MAC 300a, 300b. These MAC's may be a single MAC 240.

As shown in FIG. 9, the packet conversion circuit 250a, 250b is constituted of a buffer 2510 and a counter 2520. The buffer 2510 temporarily stores a portion of a packet received at MAC 300a, 300b when the packet is stored in the reception FIFO 110a, 110b or transfer FIFO 130a, 130b.

Figure 18:
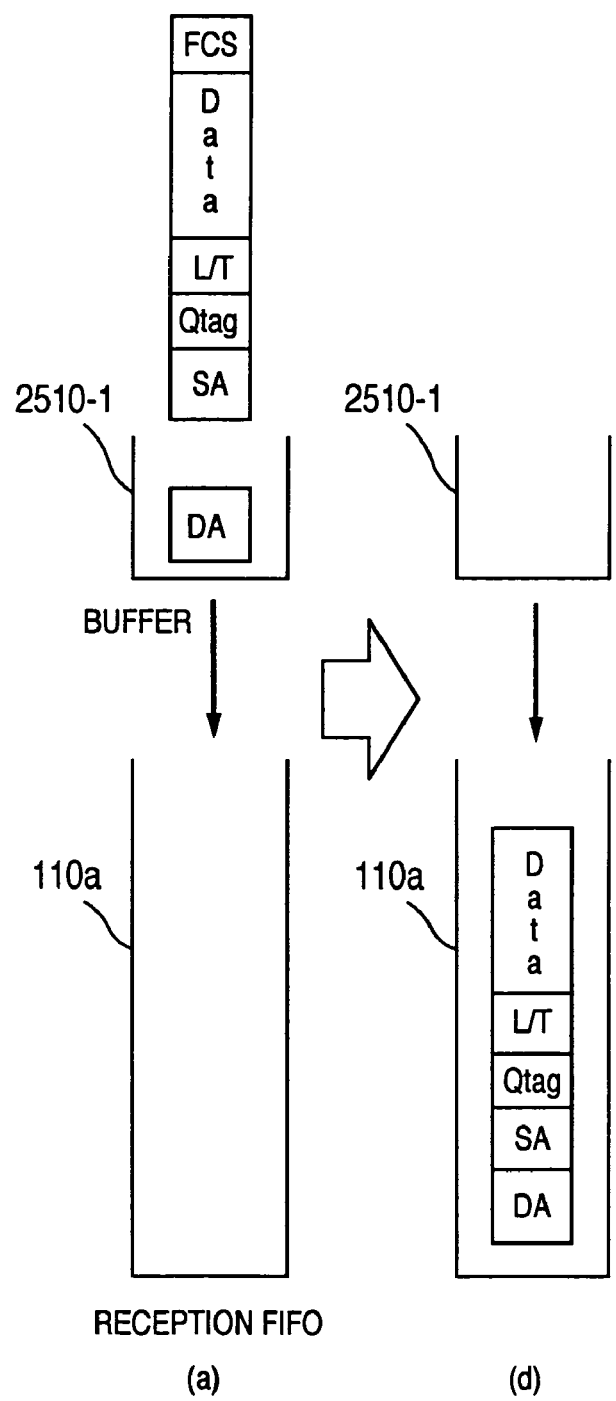
FIG. 18 is a diagram illustrating a process of writing a tagged packet into a reception FIFO for packet transfer.
Figure 19:
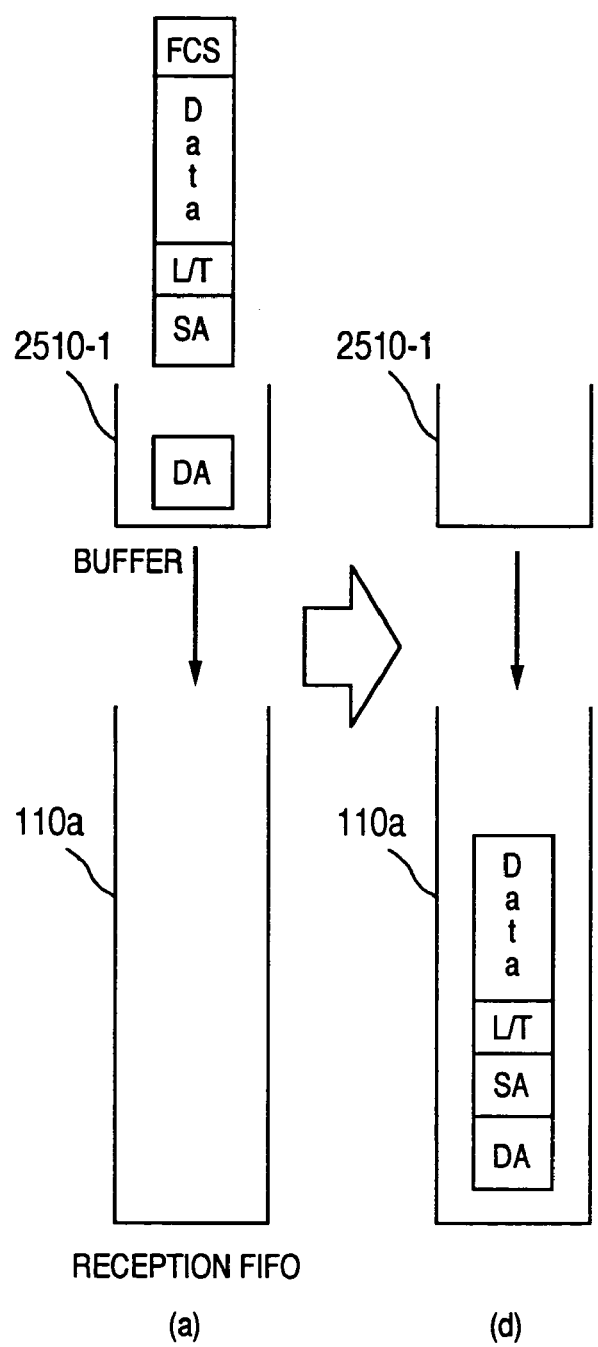
FIG. 19 is a diagram illustrating a process of writing a basic packet into a reception FIFO for packet transfer.

The counter 2520 counts a packet received at MAC 300a, 300b in the unit of byte. The counter 2520 is used for dividing a basic packet or tagged packet shown in FIG. 18 into frames, checking whether the Qtag frame is present, and inserting or delating the Qtag frame for packet conversion.

In the transfer judging circuit 200 constructed as above, when the control circuit (220a (220b) as the transfer control means judges that a reception packet received at MAC 300a (300b) is a transfer packet, this reception packet is output to the transfer FIFO 130a (130b), to MAC 300a (300b) corresponding to the Ethernet communication apparatus 830a (830b) as the communication object at the destination of the transmission packet generated by CPU 1, and to MAC 300a (300b) corresponding to the Ethernet communication apparatus 830a (830b) at the destination of the transfer packet held in the transfer FIFO 130a (130b). More specifically, the control circuit 220a (220b) inquires CAM 240a (240b) to determine receive, transfer, receive & transfer or drop of the packet received at MAC 300a (300b). If the packet received at MAC 300a (300b) is to be received, the packet is written in the reception FIFO 110a (110b), if the packet is to be transferred, it is written in the transfer FIFO 130a (130b), if the packet is to be received and transferred, it is written in both the reception FIFO 110a (110b) and transfer FIFO 130a (130b). If the packet is to be dropped, it is dropped without writing it in the reception FIFO 110a (110b) and transfer FIFO 130a (130b).

In accordance with the set values of the registers R2310 in the register 230a (230b) and the table shown in FIG. 10, when a packet is to be written in the transfer FIFO 130a, 130b, the control circuit 220a (220b) checks each frame of the packet by using the counter 2520. If a tagged packet is to be converted into a basic packet, the Qtag frame is not written in the transfer FIFO, whereas if a basic packet is to be converted into the tagged packet, the Qtag frame is inserted and written in the transfer FIFO.

Packet conversion can be performed at the same time when the packet received at MAC 300a, 300b is written in the transfer FIFO 130a, 130b. An overhead for packet conversion can be made zero. As the Qtag value of the Qtag frame to be inserted when a basic packet is converted into a tagged packet, the Qtag value set to the register R2311 is used.

The control circuit 220a, 220b selects one of the selectors 210a and 210b to make MAC 300a, 300b send a packet stored in the transmission FIFO 120a, 120b or a packet stored in the transfer FIFO 130a, 130b.

Figure 11:
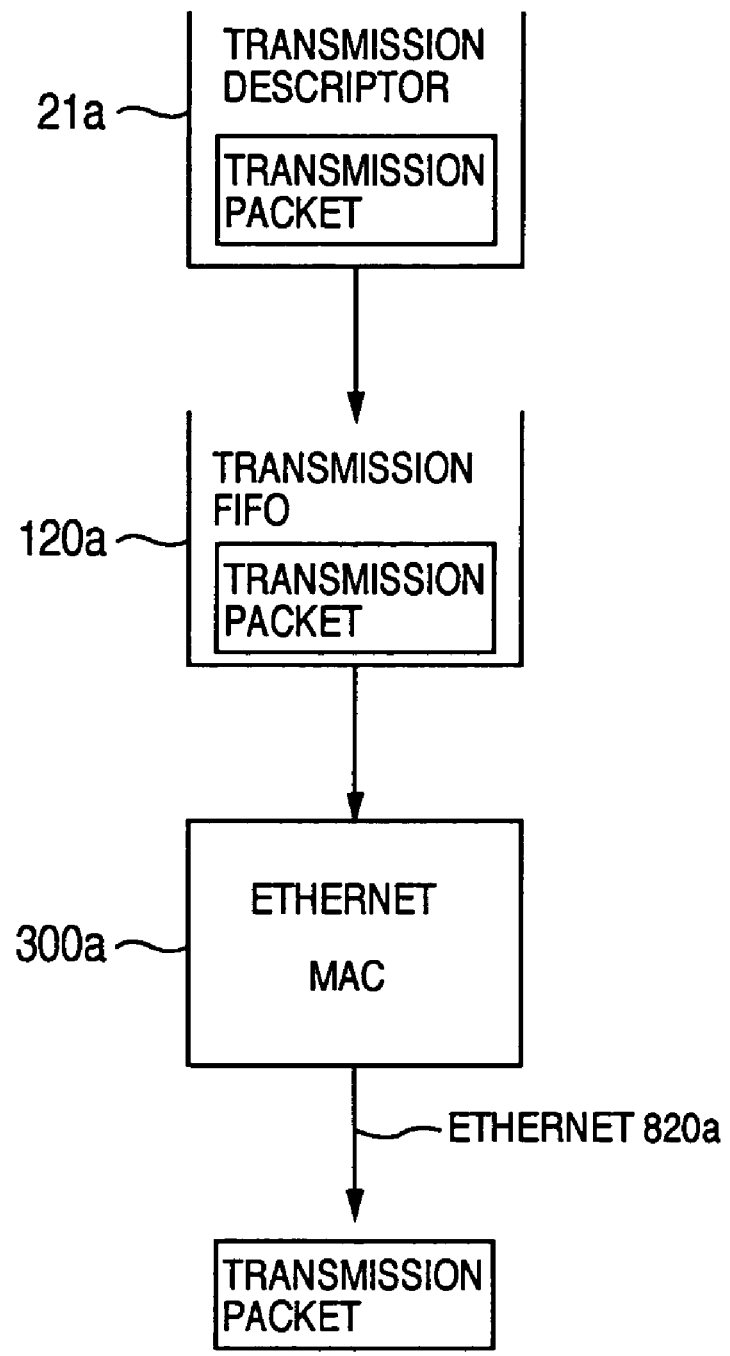
FIG. 11 is a flow chart illustrating a packet transmission process according to the invention.

Next, with reference to FIG. 11, a packet transmission process will be described. In transmitting a packet from the two-channel Ethernet communication apparatus 800 and two-channel communication module 4, CPU 1 activates the two-channel communication module 4. The two-channel communication module 4 reads a transmission packet from the transmission descriptor 21a (21b) in the memory 2 under the control of the control circuit 410 of the bus I/F circuit 400, and writes the packet data in the transmission FIFO 120a (120b). This packet is read from the transmission FIFO 120a (120b) and transmitted to the Ethernet cable 820a (820b).

Figure 12:
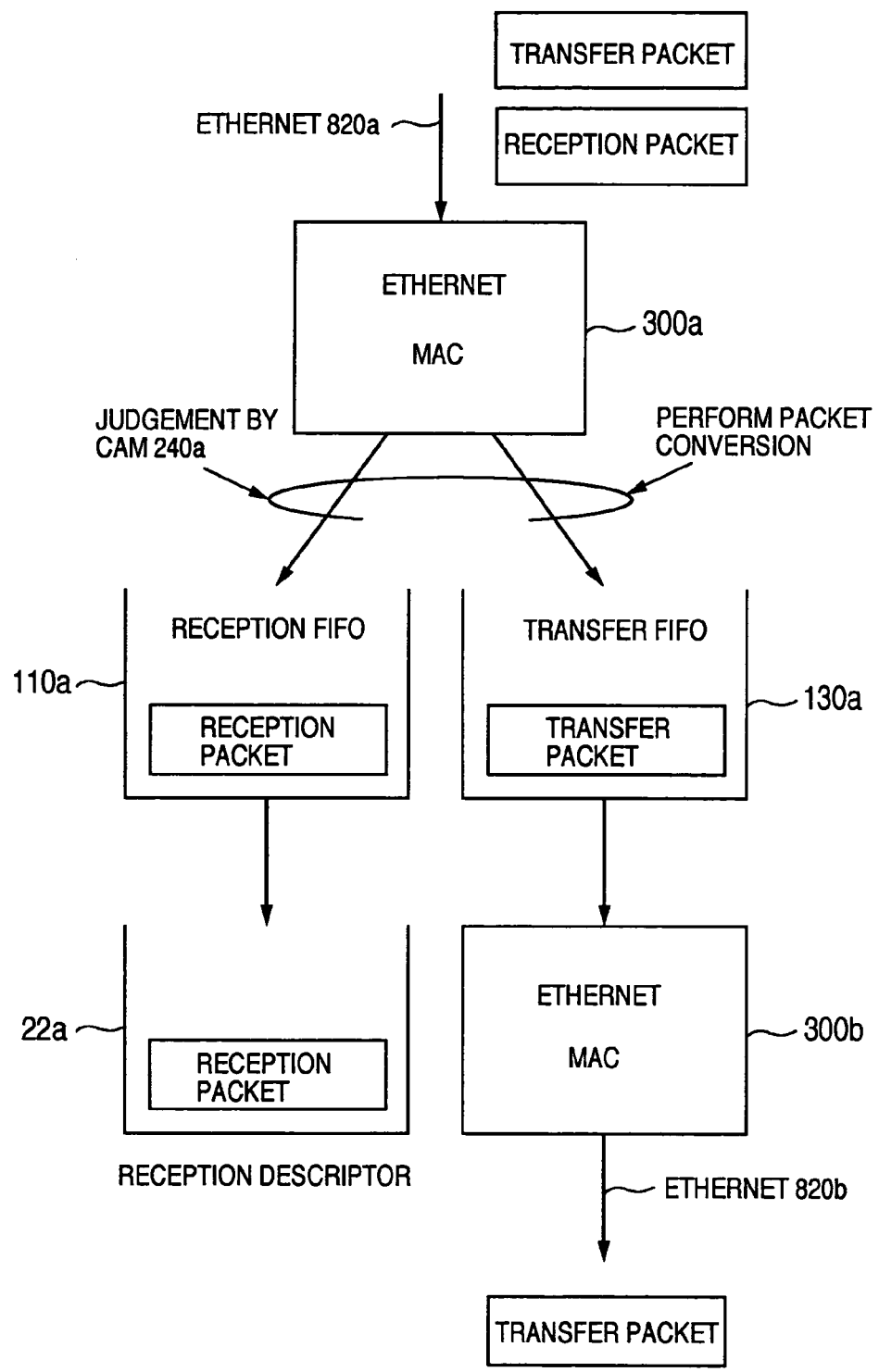
FIG. 12 is a flow chart illustrating a packet reception/transfer process according to the invention.

In the packet reception and transfer process, as shown in FIG. 12, as MAC 300a (300b) receives the packet, the transfer judging circuit 200 checks the destination MAC address of the packet and checks by using CAM 240a (240b) whether the packet is received or transferred. If it is judged that the packet is to be received, the packet is written in the reception FIFO 110a (110b). The bus I/F circuit 400 reads the packet from the reception FIFO 110a (110b) and writes it in the reception descriptor 22a (22b) in the memory 2 via the bus 3.

If the packet is to be transferred, the transfer judging circuit 200 judges whether the packet received at MAC 300a (300b) is to be converted. If necessary, the packet is converted and written in the transfer FIFO 130a (130b). MAC 300b (300a) reads the packet from the transfer FIFO 130a (130b) and sends it to the Ethernet cable 820b (820a).

Figure 13:
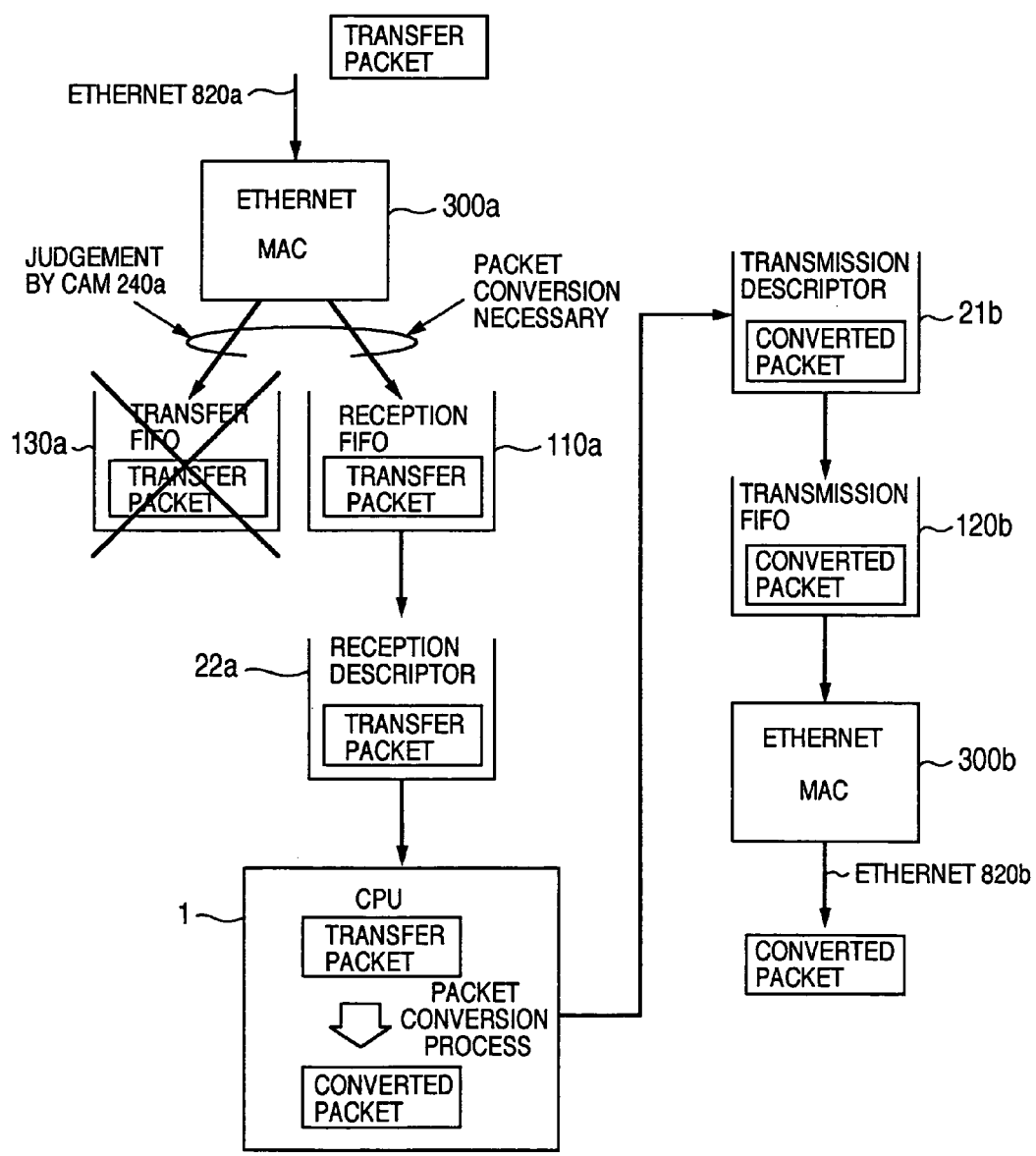
FIG. 13 is a flow chart illustrating a process of performing packet conversion of the invention to be executed by CPU.

If the packet conversion circuit 250 does not exist and CPU 1 performs packet conversion, a packet to be transferred without packet conversion is transferred by using the transfer FIFO 1301 (130b) as shown in FIG. 12. As shown in FIG. 13, a packet to be transferred with packet conversion is added with information that the packet is a transfer packet necessary for packet conversion, by using the reception FIFO 110a (110b), and then written in the reception descriptor 22a (22b) in the memory 1. CPU 1 reads the packet from the reception descriptor 22a (22b), performs packet conversion, writes the converted packet in the transmission descriptor 21a (21b), and activates the two-channel communication module 4. In this case, CPU 1 only adds or deletes the Qtag frame and will not change other frames of the packet.

The two-channel communication module 4 reads the converted packet from the transmission descriptor 21a (21b) and writes it in the transmission FIFO 120a (120b). MAC 300a (300b) reads the packet from the transmission FIFO 120a (120b) and sends it to the Ethernet cable 820a (820b).

The number of motions of the packet is six, MAC 300→reception FIFO 110→reception descriptor 22→process by CPU 1→transmission descriptor 21→transmission FIFO 120→MAC 300 so that there is a large overhead. Packet conversion by CPU 1 is necessary so that if the number of packets to be transferred with packet conversion becomes large, a CPU load becomes large and packet conversion becomes impossible. A process to be performed for a packet to be received is therefore delayed. A flow control is therefore required to be activated, and the packet to be transferred and the received packet are dropped. When there is a dropped packet, a packet retransmission request occurs so that an efficiency of Ethernet lowers and a process ability of CPU itself is degraded.

In the present invention, the transfer judging circuit 200 processes both a packet to be transferred without packet conversion and a packet to be transferred with packet conversion to realize a zero load of CPU for the transfer process. At the same time when a packet received at MAC 300a (300b) is written in the transfer FIFO 130a (130b), packet conversion is performed to realize a zero overhead of transfer with packet conversion.

Figure 14:
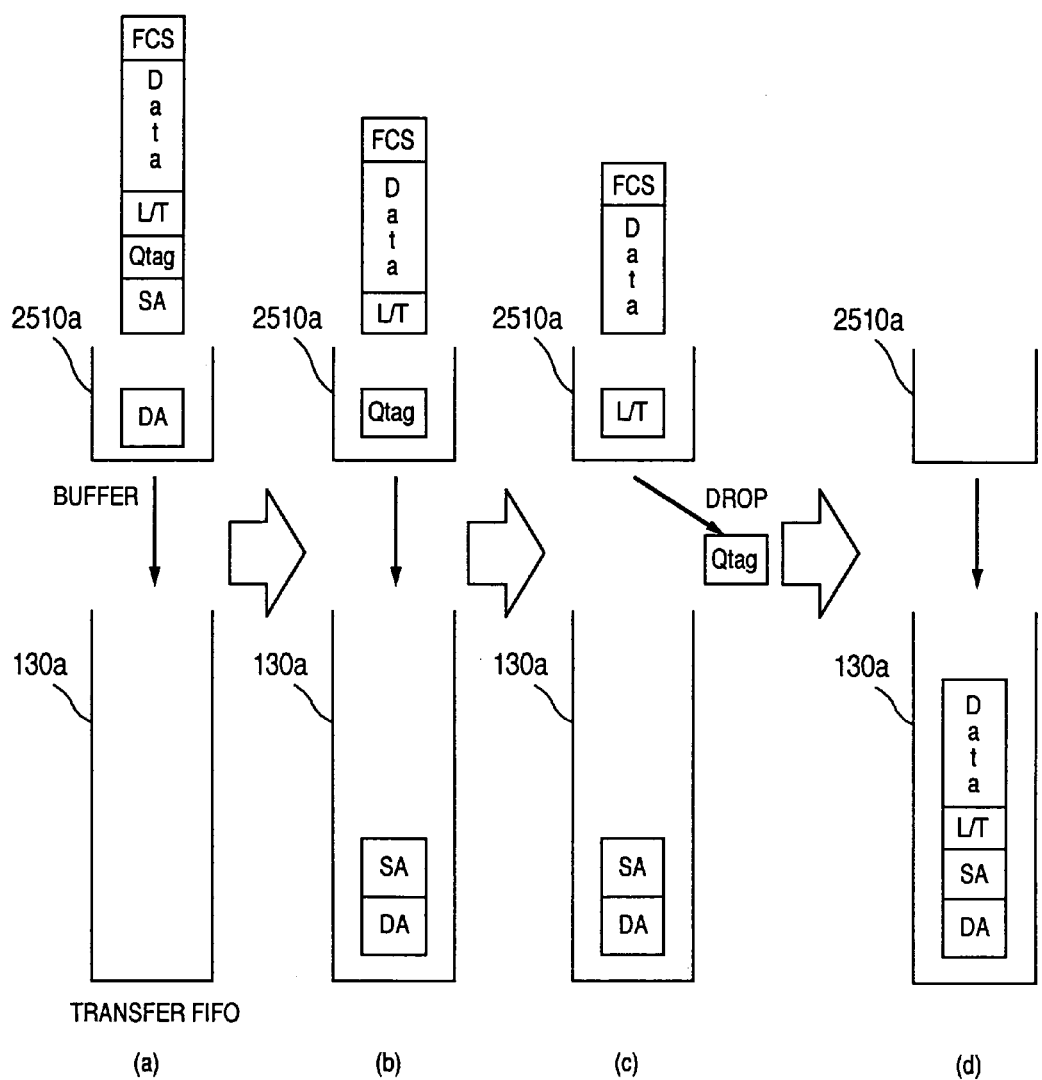
FIG. 14 is a diagram illustrating conversion of a tagged packet into a basic packet for packet transfer according to the invention.

A conversion process to be performed by the transfer judging circuit 200 of this embodiment when a packet is transferred will be described with reference to FIGS. 14 to 18. FIG. 14 illustrates a procedure of converting a tagged packet into a basic packet. A packet to be sent or received by MAC 300*a* is processed by using the selector 210*a*, control circuit 220*a*, register 230*a*, CAM 240*a* and packet conversion circuit 250*a*, whereas a packet to be sent or received by MAC 300*b* is processed by using the selector 210*b*, control circuit 220*b*, register 230*b*, CAM 240*b* and packet conversion circuit 250*b*. In the following the suffixes a and b are omitted.

(a) As MAC 300 starts receiving a packet, the packet data is sequentially sent to a buffer 2510. In response to this, the control circuit 220 resets the count of the counter 2520 to 0 and activates it. The counter 2520 counts the total byte of the packet data sent from MAC 300. When the counter 2520 counts 6 bytes which are the DA frame length, a destination address in the DA frame is inquired to CAM 240. From the inquiry results and the value of the register R2301 in the register 230, it is judged whether the frame is received, transferred, received and transferred, or dropped. In accordance with this judgement, the write destination of the packet is determined. The write destination is the reception FIFO for receive, the transfer FIFO for transfer, the reception FIFO and transfer FIFO for receive & transfer, and no write destination for drop. In the example shown in FIG. 14, the transfer FIFO is shown for transfer or receive & transfer.

(b) The control circuit 220 writes the DA frame into the transfer FIFO 130 and an SA frame entering the buffer 2510 also into the transfer FIFO 130. When the count becomes 12 bytes, a Qtag frame enters the buffer 2510. When the counter becomes 14 bytes, by using this 2-byte, the control circuit judges whether the frame next to the SA frame is a Qtag frame (tagged packet) or an L/T frame (basic packet). If the 2-byte is 0x8100 (hexadecimal notation) set to the register R2312, it is judged that the frame is the Qtag frame, and if the 2-byte is a different value, it is judged that the frame is the L/T frame. In the example shown in FIG. 14, the Qtag frame enters so that the control circuit 209 judges that the packet received by MAC 300 is the tagged packet.

(c) The control circuit 220 judges from the contents of the register R2310 in the register 230 shown in FIG. 10 whether packet conversion is required for transfer. In this case, since the packet conversion into a basic packet is necessary, the control circuit 220 skips writing 4 bytes of the Qtag frame into the transfer FIFO 130 to drop-the Qtag frame.

(d) When the count reaches 16 bytes, the next frames are the L/T frame and Data frame. The control circuit 220 writes the data in the buffer 2510 into the transfer FIFO 130. The last FCS frame is used for judging whether the packet received at MAC 300 is correct, and is not transferred to the buffer 2510.

Therefore, of the frames constituting the packet received at MAC 300, only four frames including DA, SA, L/T and Data are written in the transfer FIFO 130.

With the above procedure, the tagged packet received at MAC 300 is converted into a basic packet while the frames are written in the transfer FIFO 130, with a zero overhead.

Figure 15:
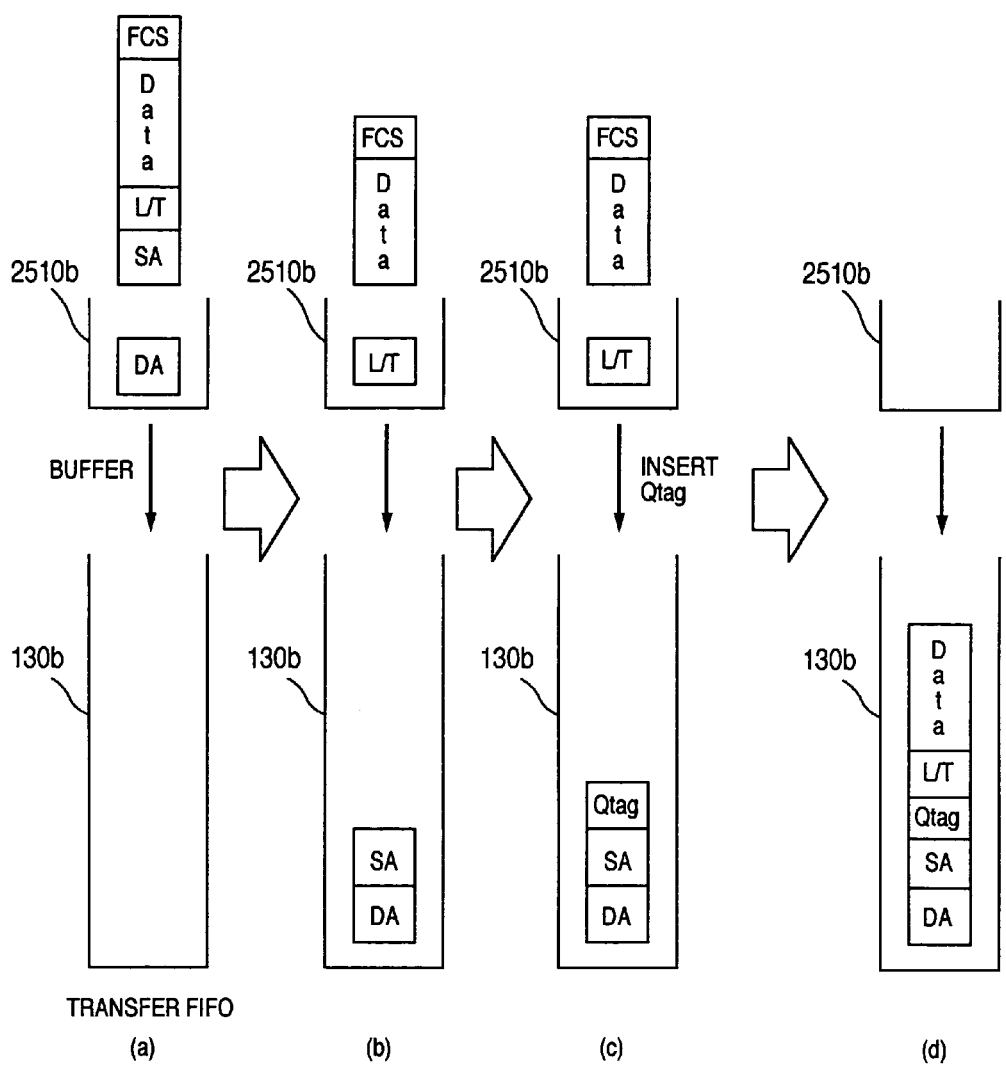
FIG. 15 is a diagram illustrating conversion of a basic packet into a tagged packet for packet transfer according to the invention.

Next, with reference to FIG. 15, a procedure of converting a basic packet into a tagged packet will be described.

(a) As MAC 300 starts receiving a packet, the control circuit 220 resets the count of the counter 2520 to 0 and activates it. Similar to FIG. 14, when the counter 2520 counts 6 bytes, the destination MAC address is inquired to CAM 240 to determine a write destination FIFO. In the example shown in FIG. 15, the transfer FIFO for transfer or receive & transfer is used. (b) The control circuit 220 writes the DA frame in the buffer 2510 into the transfer FIFO 130 and the next SA frame also into the transfer FIFO 130. When the count becomes 12 bytes, the L/T frame enters the buffer 2510.

When the counter becomes 14 bytes, by using this 2-byte, the control circuit 220 judges that the frame is the L/T frame and the packet received at MAC 300 is a basic packet.

(c) The control circuit 220 judges from the contents of the register R2310 that the packet conversion into a tagged packet is necessary, and writes the Qtag value set in the register R2511 into the transfer FIFO 130 to perform a process of inserting the Qtag frame.

(d) After the control circuit 220 writes the L/T frame in the buffer 2510, it writes the Data frame also in the transfer FIFO 130. In this manner, a tagged packet with the inserted Qtag frame is written in the transfer FIFO 130.

With the above-described procedure, the basic packet received at MAC 300 is converted into the tagged packet while the frames are written in the transfer FIFO 130, with a zero overhead.

Figure 16:
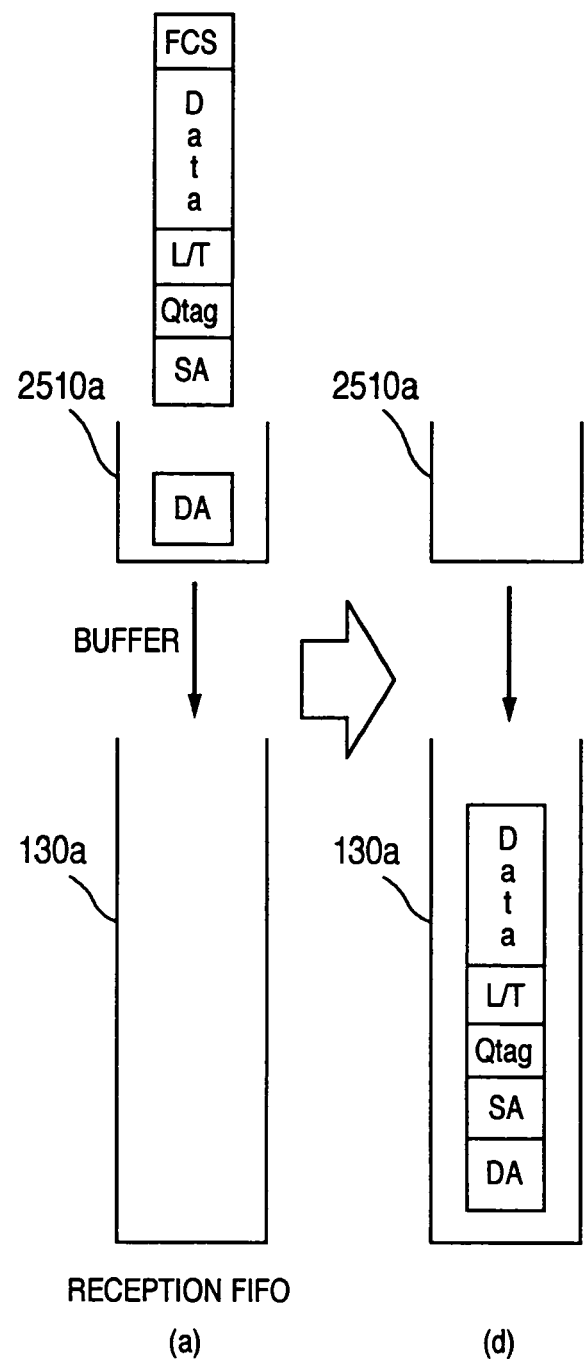
FIG. 16 is a diagram illustrating a process of writing a tagged packet directly into a transfer FIFO for packet transfer.
Figure 17:
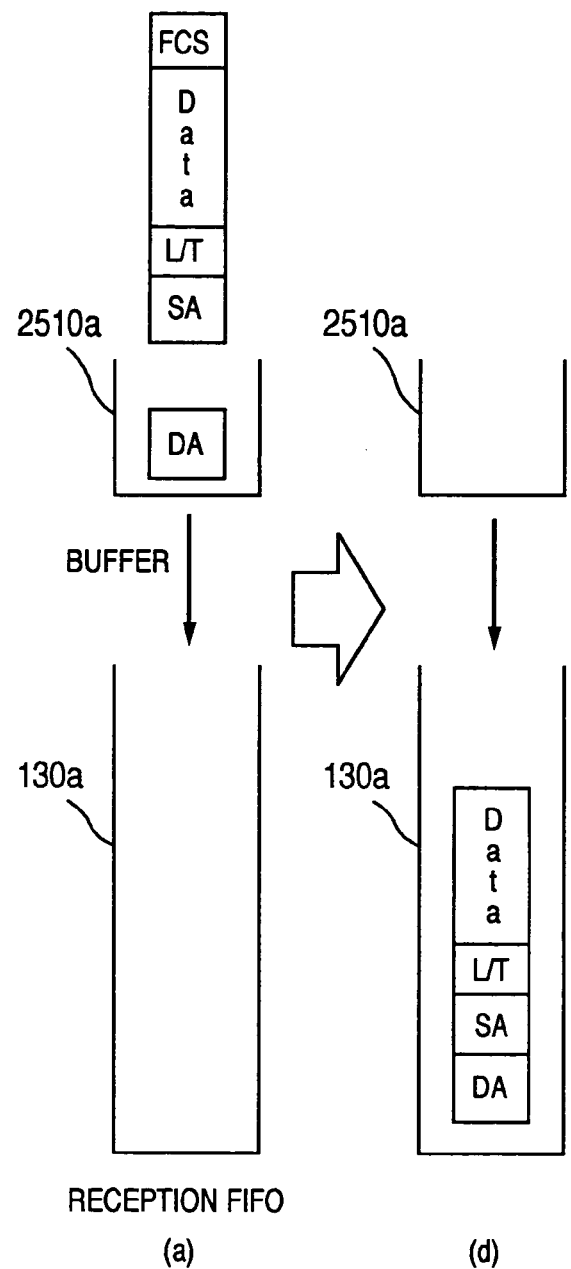
FIG. 17 is a diagram illustrating a process of writing a basic packet directly into a transfer FIFO for packet transfer.

FIGS. 16 and 17 illustrate the operation of transferring a tagged frame and a basic packet without any packet conversion.

(a) As MAC 300 starts receiving a packet, the control circuit 220 resets the count of the counter 2520 to 0 and activates it. Similar to FIGS. 14 and 15, when the counter 2520 counts 6 bytes, the control circuit 220 inquires the destination MAC address to CAM 240 to determine a write destination FIFO. In the examples shown in FIGS. 16 and 17, the transfer FIFO for transfer or receive & transfer is used.

(b) The control circuit 220 writes the DA frame in the buffer 2510 into the transfer FIFO 130 and the next SA frame also into the transfer FIFO 130. When the count becomes 12 bytes, the Qtag frame (L/T frame) enters the buffer 2510.

When the counter becomes 14 bytes, by using this 2-byte, the control circuit 220 judges that the frame is the Qtag frame (L/T frame) and the packet received at MAC 300 is a tagged packet (basic packet).

Next, the control circuit 220 judges from the contents of the register R2310 that the packet conversion is not necessary, and writes the Qtag frame, L/T frame and Data frame (L/T frame and Data frame) into the transfer FIFO 130.

With the above-described procedure, the packet received at MAC 300 is written into the transfer FIFO 130 without any packet conversion.

In receiving a packet, the packet received at MAC 300*a* (300*b*) is written in the reception FIFO 110*a* (110*b*). When a packet is received, packet conversion is not performed, so that the operation same as that shown in FIGS. 16 and 17 is performed, with the write destination being changed from the transfer FIFO 130 to the reception FIFO 110.

As described above, the transfer judging circuit 200 can realize packet conversion (tagged packet→basic packet, basic packet→tagged packet) for transfer without any load on CPU and with a zero overhead of packet conversion.

Next, another embodiment of packet conversion will be described. In this embodiment, when a basic packet received at MAC 300*a*, 300*b* is converted into a tagged packet and written in the transfer FIFO 130*a*, 130*b*, the Qtag value to be inserted is determined in accordance with a source MAC address or a destination MAC address of the basic packet. The structure of the two-channel Ethernet communication apparatus 800 and two-channel communication module 4 is the same as that of the previously described embodiment shown in FIGS. 1 and 5. Different points are only the registers 230*a* and 230*b* and packet conversion circuit 250 and the operation of the transfer judging circuit 200.

As shown in FIG. 20, the register 230*a*, 230*b* has two new registers R2313 in addition to the registers R2301, R2310, R2311 and R2312 used in the previously described embodiment (FIG. 9). The register R2313 is used for setting which one of the source and destination MAC addresses is used for inquiry to CAM 2530 in order to obtain a packet conversion mode and the Qtag value to be inserted for packet conversion from a basic packet into a tagged packet for the packet transfer between MAC's 300a and 300b. The packet conversion mode set to the register R1310 and the Qtag value to be inserted and set to the register R2311 are used when the source or destination MAC address of the packet set to the register R2313 is not registered in CAM 2530 or Qtag information registered in CAM 2530 is invalid.

The structure of the packet conversion circuit 250 is shown in FIG. 21. The packet conversion circuit 250 is constituted of the buffer 2510, counter 2520 and CAM 2530. The buffer 2510 temporarily stores a portion of a packet received at MAC 300a, 300b when the packet is stored in one or both of the reception FIFO 110a, 110b or transfer FIFO 130a, 130b. The counter 2520 counts the number of bytes of the packet in the buffer 2510. By using the count of the counter 2520, the transfer control circuit 220a, 220b analyzes the frame structure of a packet received at MAC 300a, 300b to judge whether the packet is a basic packet or a tagged packet, to skip a Qtag frame write operation for packet conversion from the basic packet into the tagged packet, and to detect an insertion point of the Qtag frame and insert this frame for packet conversion from the tagged packet into the basic packet.

CAM 2530 is a special memory called a content addressable memory. As shown in FIG. 22, each entry has: a MAC address; corresponding packet conversion information (conversion from a basic packet into a tagged packet, conversion from a tagged packet into a basic packet, transfer without packet conversion, in conformity with the settings in the register R2310), Qtag information (a V bit representative of whether the Qtag value is valid, and a Qtag value itself) set to the Qtag frame and inserted when a basic packet is converted into a tagged packet; and a work area. As a MAC address is input, the information in the entry having the same MAC address as the input MAC address is output. The work area is used when CPU 1 updates the entry.

If there are a plurality of MAC addresses same as the input MAC address, the information in the entry having the smallest index number is output. CPU 1 sets or updates each entry of CAM 2530.

A conversion process to be performed by the transfer judging circuit 200 when a packet is transferred will be described with reference to FIG. 12. A packet to be sent or received by MAC 300a is processed by using the selector 210a, control circuit 220a, register 230a, CAM 240a and packet conversion circuit 250a, whereas a packet to be sent or received by MAC 300b is processed by using the selector 210b, control circuit 220b, register 230b, CAM 240b and packet conversion circuit 250b. In the following the suffixes a and b are omitted.

(a) As MAC 300 starts receiving a packet, the packet data is sequentially sent to a buffer 2510. In response to this, the control circuit 220 resets the count of the counter 2520 to 0 and activates it. The counter 2520 counts the total byte of the packet data sent from MAC 300. When the counter 2520 counts 6 bytes which are the DA frame length, a destination MAC address in the DA frame is inquired to CAM 240. From the inquiry results and the value of the register R2301 in the register 230, it is judged whether the frame is received, transferred, received and transferred, or dropped. In accordance with this judgement, the write destination of the packet is determined. The write destination is the reception FIFO 110 for receive, the transfer FIFO 130 for transfer, the reception FIFO 110 and transfer FIFO 130 for receive & transfer, and no write destination for drop.

(b) When the control circuit 220 judges at (a) that the packet is transferred, or received & transferred, it judges from the value of the register R2313 which one of the destination and source MAC addresses is used for the inquiry to CAM 2530, in order to obtain the packet transfer mode and the Qtag value to be inserted from the value of the register R2313. If the destination MAC address is to be used, CAM 2530 is inquired by using the destination MAC address in the DA frame, and in accordance with the inquiry results and the value of the register R2310, the packet conversion mode is determined, and in accordance with the inquiry results of CAM 2530 and the value of the register R2311, the Qtag value to be inserted is determined. The DA frame is written in the transfer FIFO 130 and the next SA frame is also written in the transfer FIFO 130. If CAM 2530 is inquired by using the source MAC address in accordance with the value of the register 2313, the DA frame is written in the transfer FIFO 130 and the control circuit 220 waits for the next SA frame to be entered in the buffer 2510. When the count of the counter 2520 reaches 12 bytes, the control circuit 220 inquires CAM 2530 by using the source MAC address held in the SA frame, and in accordance with the inquiry results and the values of the registers R2310 and R2311, the packet conversion mode and Qtag value to be inserted are determined and the SA frame is written in the transfer FIFO 130.

The packet conversion mode includes three modes, a tagged packet conversion mode, a basic packet conversion mode and a transfer mode without packet conversion.

(c) Next, a Qtag frame enters the buffer 2510 if the packet is the tagged packet, or an L/T frame enters the buffer 2510 if the packet is the basic packet. When the count of the counter 2520 reaches 14 bytes and if the 2-byte is 0x8100 (hexadecimal notation) set to the register R2312, it is judged that the next frame is the Qtag frame. If the 2-byte is a different value, it is judged that the next frame is the L/T frame. If the judgement is the Qtag frame, it is judged that the packet is the tagged packet, whereas if the judgment if the L/T frame, it is judged that the packet is the general frame. In accordance with this judgement, the control circuit 220 determines the packet conversion contents (transfer without packet conversion, transfer with conversion into a basic packet, transfer with conversion into a tagged packet) shown in FIG. 10 by using the packet type and the packet conversion mode determined at (b).

(d-1: transfer without conversion) If the packet is the tagged packet, the control circuit 220 sequentially writes the Qtag frame in the buffer 2510, the L/T frame next entering the buffer 2510 and then the Data frame into the transfer FIFO 130. If the packet is the basic packet, the control circuit 220 sequentially writes the L/T frame in the buffer 2510 and the Data frame next entering the buffer 2510 into the transfer FIFO 130. In this manner, the packet received at MAC 300 is written in the transfer FIFO 130 without packet conversion.

(d-2: transfer with conversion into the basic packet) The packet is the tagged packet. The control circuit 220 drops the Qtag frame including 2-byte in the buffer 2510 by skipping a write operation into the transfer FIFO 130, until the count of the counter 2520 reaches 16 bytes. The control circuit 220 writes the L/T frame next entering the buffer 2510 and the Data frame into the transfer FIFO 130. In this manner, the tagged packet received at MAC 300 is converted into the basic packet with only the Qtag frame being dropped and the basic packet is written in the transfer FIFO 130.

(d-3: transfer with conversion into the tagged packet) This packet is the basic packet. The control circuit 220 writes the Qtag frame having the Qtag value judged at (b) into the transfer FIFO 130. The Data frame next entering the buffer 2510 including the 2-byte in the buffer 2510 is written in the transfer FIFO 130. In this manner, the basic packet received as MAC 300 is converted into the tagged packet which is written in the transfer FIFO 130, the tagged packet having the inserted Qtag frame having the Qtag value determined by CAM 2530 and the register R2311.

If it is judged at (a) to be received or received & transferred, each frame entering the buffer 2510 is directly written in the reception FIFO 110 to write the packet itself received at MAC 300 into the reception FIFO 110.

As described above, it is possible to set the packet conversion mode and the Qtag value to be inserted when the packet is converted into the tagged packet, in accordance with the source or destination MAC address of the packet received at MAC 300a, 300b.

Lastly, another embodiment of the packet conversion method will be described. In this embodiment, the packet conversion circuit 200 converts a packet to be received at the packet communication apparatus 800 into a basic packet, converts a packet to be transmitted from the packet communication apparatus 800 into a tagged packet, and converts a packet to be transferred. Even if the packet generating and processing program to be executed by CPU 1 cannot generate and process the tagged packet, the packet communication apparatus 800 realize the transmission, reception and transfer of the tagged packet.

The structure of the two-channel Ethernet communication apparatus 800 and two-channel communication module 4 is the same as that of the embodiment shown in FIGS. 1 and 5. Different points are only the packet conversion circuit 250 and the operation of the transfer judging circuit 200.

Figure 24:
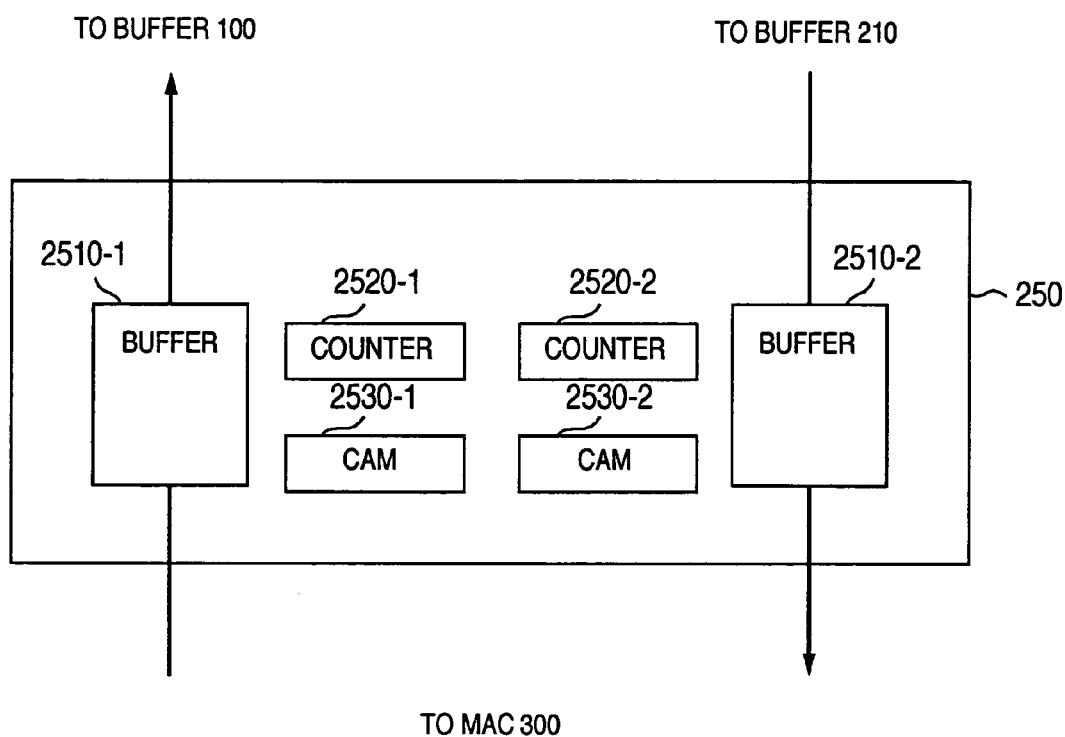
FIG. 24 is a diagram illustrating packet conversion conditions for packet transmission according to the invention.

The packet conversion circuit 250 converts a packet received at MAC 300a, 300b into a basic packet when it is written in the reception FIFO 110, and when MAC 300a, 300b reads a packet in the transmission FIFO 120 or transfer FIFO 130 to send it, converts the packet into a basic packet or a tagged packet. In this manner, the packet conversion circuit 250 performs packet conversion irrespective of whether the packet is read from either the transmission FIFO 120 or the transfer FIFO 130. The structure of the packet conversion circuit 250 is shown in FIG. 24. The packet conversion circuit 250 is constituted of buffers 2510-1 and 2510-2, counters 2520-1 and 2520-2 and CAM's 2530-1 and 2530-2.

As shown in FIG. 23, the register 230a, 230b has two new registers R2314 and R2315 in addition to the five registers R2301, R2310 to R2313 used in the embodiment (FIG. 20). The register R2315 is used for setting which one of the source and destination addresses is used to inquire CAM 2530-1 and obtain the receiving packet conversion mode when the packet received at MAC 300a, 300b is written in the reception FIFO 110a, 110b. The register R2314 is used for setting the receiving packet conversion mode if the source or destination MAC address of the packet set by the register R2315 is not yet registered in CAM 2530.

The registers R2310 to 2312 are all used for setting packet conversion of a packet to be sent from MAC 300a, 300b. The registers R2310 and R2311 are used for setting a default sending packet conversion mode (tagged packet sending mode, basic packet sending mode, sending mode without conversion) for a packet to be sent from MAC 300a, 300b and for setting the default Qtag value to be inserted.

Next, the packet conversion circuit 250 will be described.

The symbols in the packet conversion circuit 250a are added with a suffix a, and the symbols in the packet conversion circuit 250b are added with a suffix b. The buffer 2510-1a (2510-1b) is used for temporarily storing a portion of a packet received at MAC 300a (300b) when the packet is written in one of or both the reception FIFO 110a (110b) and transfer FIFO 130a (130b). The buffer 2510-2a (2510-2b) is used for temporarily storing a portion of a packet held in the transmission FIFO 120a (120b) or transfer FIFO 130b (130a) when the packet is output to MAC 300a (300b). The counter 2520-1a (2520-1b) counts the number of bytes of the packet received at MAC 300a (300b) and loaded in the buffer 2510-1a (2510-1b). The counter 2510-2a (2510-2b) counts the number of bytes of the packet held in the transmission FIFO 120a (120b) or transfer FIFO 130b (130a) and loaded in the buffer 2510-2a (2510-2b).

The structure of CAM's 2530-1a, 2530-1b, 2530-2a and 2530-2b is the same as the previously described embodiment (FIG. 22). CAM 2530-1a, 2530-1b outputs a packet conversion mode to the source or destination MAC address of a packet received at MAC 300a, 300b when the packet is received, and CAM 2530-2a, 2530-2b outputs the packet conversion mode and Qtag information to be inserted, to the source or destination MAC address of a packet to be sent from MAC 300a, 300b.

The received packet conversion mode for packet conversion to be performed when a packet received at MAC 300a, 300b is written in the reception FIFO 120 is determined in the following manner.

In the received packet conversion mode, if the source or destination MAC address of the packet set by the register R2315 is already registered in CAM 2530-1, the registered received packet conversion mode (receiving with conversion into a basic packet, receiving without conversion) is adopted. If the MAC address is not registered, the receiving packet conversion mode set by the register R2314 is adopted.

The sending packet conversion mode and Qtag value for the packet to be sent by MAC 300a, 300b is determined in the following manner.

In the packet conversion mode, if the source or destination MAC address of the packet set by the register R2313 is already registered in CAM 2530-2, the registered sending packet conversion mode (sending with conversion into a basic packet, sending with conversion into a tagged packet, sending without conversion) is adopted. If the MAC address is not registered, the sending packet conversion mode set by the register R2310 is adopted.

If the source or destination MAC address of the packet set by the register R2313 is already registered in CAM 2530-2 and if the registered Qtag information is valid, the Qtag value set as Qtag information is adopted as the Qtag value to be inserted. In other cases (if the Qtag information is invalid or if the MAC address is not registered in CAM 2530), the Qtag value set by the register R2313 is used.

CPU 1 sets the contents of the register 230a, 230b and sets and updates each entry of the packet conversion circuit 250a, 250b.

Figure 25:
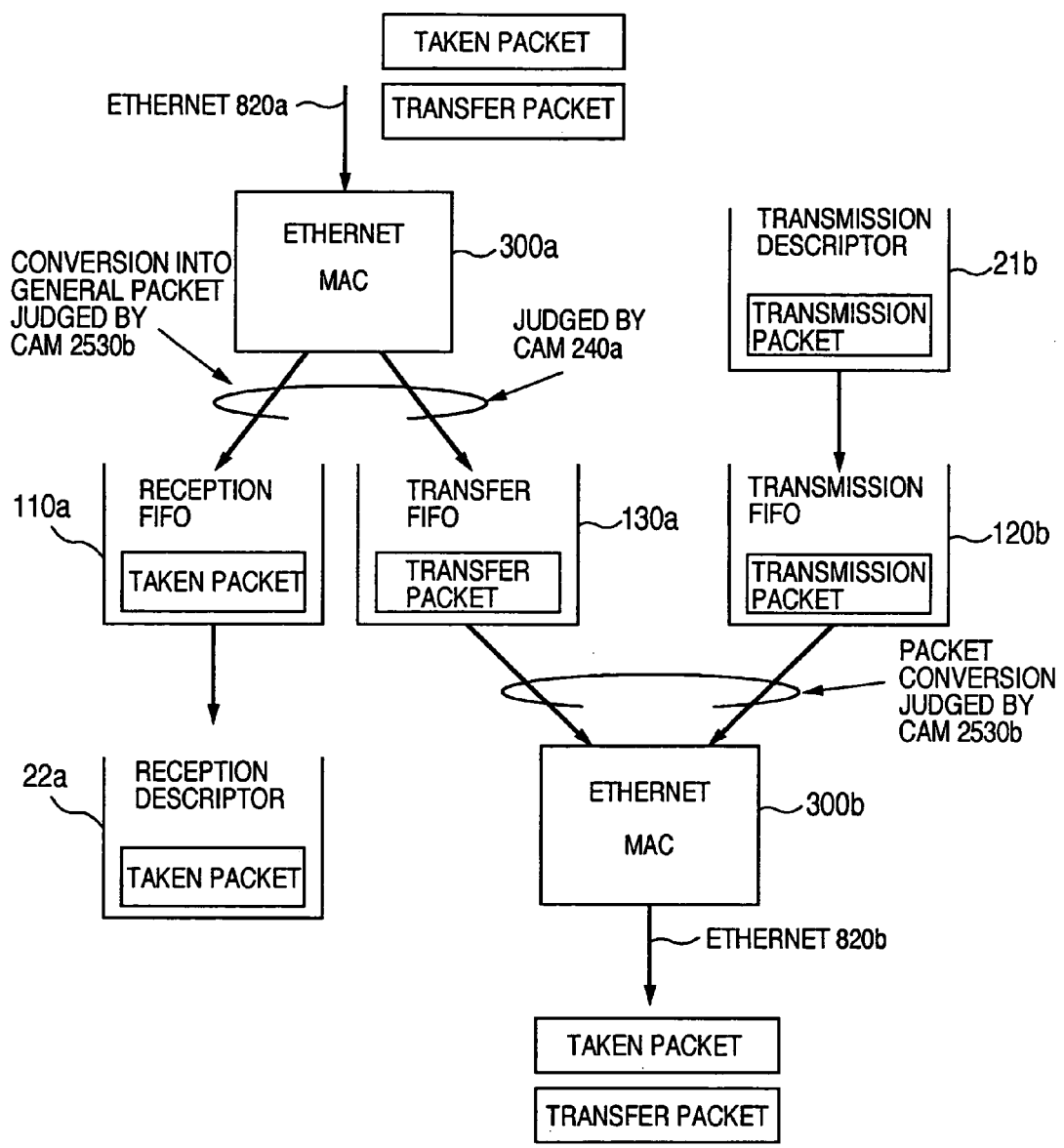
FIG. 25 is a diagram illustrating a process of writing a received packet into a reception FIFO.

The packet receiving and sending operations of the transfer judging circuit 200 of this embodiment will be described with reference to FIG. 25. A packet to be sent or received by MAC 300a is processed by using the selector 210a, control circuit 220a, register 230a, CAM 240a and packet conversion circuit 250a, whereas a packet to be sent or received by MAC 300b is processed by using the selector 210b, control circuit 220b, register 230b, CAM 240b and packet conversion circuit 250b. In the following the suffixes a and b are omitted.

First, a packet receiving process will be described.

(a) As MAC 300 starts receiving a packet, the packet data is sequentially sent to the buffer 2510-1. In response to this, the control circuit 220a resets the count of the counter 2520-1 to 0 and activates it. The counter 2520-1 counts the total byte of the packet data sent from MAC 300. When the counter 2520-1 counts 6 bytes which are the DA frame length, a destination MAC address in the DA frame is inquired to CAM 240. From the inquiry results and the value of the register R2301 in the register 230, it is judged whether the frame is received, transferred, received and transferred, or dropped. In accordance with this judgement, the write destination of the packet is determined. The write destination is the reception FIFO 110 for receive, the transfer FIFO 130 for transfer, the reception FIFO 110 and transfer FIFO 130 for receive & transfer, and no write destination for drop.

(b) When the control circuit 220 judges at (a) that the packet is received, or received & transferred, it judges from the value of the register R2315 which one of the destination and source MAC addresses is used for the inquiry to CAM 2530-1, in order to obtain the packet conversion receiving mode to be used when the packet is written in the reception FIFO 110. If the destination MAC address is to be used, CAM 2530-1 is inquired by using the destination MAC address in the DA frame, and in accordance with the inquiry results and the value of the register R2314, the packet conversion mode for the packet is determined. The DA frame is written in the reception FIFO 110, and the next SA frame is also written in the reception FIFO 110.

If it is judged from the value of the register 2315 that CAM 2530-1 is inquired by using the source MAC address, the DA frame is written in the reception FIFO 110, and the control circuit 220 waits for the next SA frame to be entered in the buffer 2510-1. When the count of the counter 2520-1 reaches 12 bytes, the control circuit 220 inquires CAM 2530-1 by using the source MAC address held in the SA frame. From the inquiry results and the value of the register R2314, the packet conversion mode for the packet is determined, and the SA frame is written in the reception FIFO 110.

The packet conversion reception mode to be determined includes two modes, a basic packet conversion receiving mode and a receiving mode without conversion.

(c) Next, a Qtag frame enters the buffer 2510-1 if the packet is the tagged packet, or an L/T frame enters the buffer 2510-1 if the packet is the basic packet. When the count of the counter 2520-1 reaches 14 bytes and if the 2-byte is 0x8100 (hexadecimal notation) set to the register R2312, it is judged that the next frame is the Qtag frame. If the 2-byte is a different value, it is judged that the next frame is the L/T frame. If the judgement is the Qtag frame, it is judged that the packet is the tagged packet, whereas if the judgment is the L/T frame, it is judged that the packet is the general frame. If the judgement is the tagged frame, it can be known that the packet is the tagged packet, whereas if the judgement is the L/T frame, it can be known that the packet is the general frame. In accordance with this judgement, the control circuit 220 determines the packet conversion contents (receiving without packet conversion, receiving with conversion into a basic packet) shown in FIG. 26 by using the packet type and the receiving packet conversion mode determined at (b).

(d-1: transfer without conversion) If the packet is the tagged packet, the control circuit 220 sequentially writes the Qtag frame in the buffer 2510-1, the L/T frame next entering the buffer 2510-1 and then the Data frame into the reception FIFO 110. If the packet is the basic packet, the control circuit 220 sequentially writes the L/T frame in the buffer 2510-1 and the Data frame next entering the buffer 2510-1 into the reception FIFO 130. In this manner, the packet received at MAC 300 is written in the reception FIFO 110 without packet conversion.

(d-2: transfer with conversion into the basic packet) The packet is the tagged packet. The control circuit 220 drops the Qtag frame including 2-byte in the buffer 2510-1 by skipping a write operation into the reception FIFO 110, until the count of the counter 2520-1 reaches 16 bytes. The control circuit 220 writes the L/T frame next entering the buffer 2510-1 and the Data frame into the reception FIFO 110. In this manner, the tagged packet received at MAC 300 is converted into the basic packet with only the Qtag frame being dropped and the basic packet is written in the reception FIFO 110.

If it is judged at (a) that the packet is transferred or received & transferred, each frame entering the buffer 2510-1 is written in the transfer FIFO 130 without packet conversion to write the packet received at MAC 300 into the transfer FIFO 130 without packet conversion.

Next, the packet sending process will be described.

(a) After a packet is written in the transmission FIFO 120 or transfer FIFO 130, the control circuit 220 resets the count of the counter 2520-2 to 0 and initializes it, and makes the selector 210 select a packet in either the transmission FIFO 120 or transfer FIFO 130 to thereafter start writing the read packet data in the buffer 2510-2. The counter 2520-2 counts the number of bytes of the packet data sent from the transmission FIFO 120 or transfer FIFO 130.

(b) When the counter 2520-2 counts 6 bytes which are the DA frame length and the control circuit 220 judges that the packet is transferred or received & transferred, the control circuit 220 judges from the value of the register R2313 which one of the destination and source MAC addresses is used for the inquiry to CAM 2530-2, in order to obtain the packet conversion sending mode for packet sending and the Qtag value to be inserted. If the destination MAC address is to be used, CAM 2530-2 is inquired by using the destination MAC address in the DA frame, and in accordance with the inquiry results and the value of the register R2310, the sending packet conversion mode for the packet is determined. The Qtag value to be inserted is determined from the inquiry results of CAM 2530-2 and the value of the register R2311, the DA frame is sent to MAC 300 and the next SA frame is also sent to MAC 300.

If it is judged from the value of the register 2313 that CAM 2530-2 is inquired by using the source MAC address, the DA frame is sent to MAC 300, and the control circuit 220 waits for the next SA frame to be entered in the buffer 2510-2. When the count of the counter 2520-2 reaches 12 bytes, the control circuit 220 inquires CAM 2530-2 by using the source MAC address held in the SA frame. From the inquiry results and the values of the registers R2310 and R2311, the packet conversion mode for the packet and the Qtag value to be inserted are determined, and the SA frame is sent to MAC 300. The packet conversion mode to be determined includes three modes, a tagged packet conversion mode, conversion to basic packet and receipt and receipt with no conversion.

(c) Next, a Qtag frame enters the buffer 2510-2 if the packet is the tagged packet, or an L/T frame enters the buffer 2510-2 if the packet is the basic packet. When the count of the counter 2520-2 reaches 14 bytes and if the 2-byte is 0x8100 (hexadecimal notation) set to the register R2312, it is judged that the next frame is the Qtag frame. If the 2-byte is a different value, it is judged that the next frame is the L/T frame. If the judgement is the Qtag frame, it is judged that the packet is the tagged packet, whereas if the judgment is the L/T frame, it is judged that the packet is the general frame. In accordance with this judgement, the control circuit 220 determines the packet conversion contents (sending without packet conversion, sending with conversion into a basic packet, sending with conversion into a tagged packet) shown in FIG. 27 by using the packet type and the sending packet conversion mode determined at (b).

(d-1: sending without conversion) If the packet is the tagged packet, the control circuit 220 sequentially transmits the Qtag frame in the buffer 2510-2, the L/T frame next entering the buffer 2510-2 and then the Data frame to MAC 300. If the packet is the basic packet, the control circuit 220 sequentially transmits the L/T frame in the buffer 2510-2 and the Data frame next entering the buffer 2510-2 to MAC 300. In this manner, the packet held in the transmission FIFO 120 or transfer FIFO 130 is transmitted to MAC 300 without packet conversion and to the Ethernet cable 820.

(d-2: sending with conversion into the basic packet) The packet is the tagged packet. The control circuit 220 drops the Qtag frame including 2-byte in the buffer 2510-2 by skipping a write operation to MAC 300, until the count of the counter 2520-2 reaches 16 bytes. The control circuit 220 transmits the L/T frame next entering the buffer 2510-2 and the Data frame to MAC 300. In this manner, the tagged packet held in the transmission FIFO 120 or transfer FIFO 130 is converted into the basic packet with only the Qtag frame being dropped and the basic packet is transmitted to MAC 300 and to the Ethernet cable 820.

(d-3: transfer with conversion into the tagged packet) The packet is the basic packet. The control circuit 220 transmits the Qtag frame having the Qtag value judged at (b) to MAC 300, and then transmits the Data frame next entering the buffer 2510-2 including the 2-byte in the buffer 2510-2 to MAC 300. In this manner, the basic packet held in the transmission FIFO 120 or transfer FIFO 130 is converted into the tagged packet with the Qtag frame having the Qtag value determined by CAM 2530-2 and register R2311, and transmitted to MAC 300 and to the Ethernet cable 820.

As described above, when a packet received at MAC 300a, 300b is received, the packet conversion mode is determined in accordance with the source or destination MAC address of the packet. The packet conversion mode and the Qtag value to be inserted when the packet is converted into the tagged packet can be determined from the source or destination MAC address of a packet generated by CPU 1 or of a packet to be transferred.

Next, an embodiment of a packet communication system will be described with reference to FIG. 30, in which the packet communication apparatus of the invention is applied to an IP phone.

An IP phone 8000a is connected to two Ethernet cables 820a and 820b. One Ethernet cable 820a is connected to HUB 8100 which is connected to the Internet or an intranet. The other Ethernet cable 820b is connected to a PC or Ethernet communication apparatus 830. HUB 8100 is connected via a wide area network (WAN) such as the Internet and an intranet to the IP phone 8000b and a data center 8200 which stores home page data.

An IP phone 8000 is constituted of a two-channel Ethernet communication apparatus 800, two PHY's 810a and 810b, a hand set 8010, an A/D converter 8020 for converting a voice analog input signal into a digital signal, and a D/A converter 8030 for converting a digital signal into a voice analog output signal. The hand set 8010 is constituted of a microphone 8011 for converting a voice into an analog signal and a speaker 8012 for converting a voice analog signal input into a voice.

Speech between the IP phone 8000a and IP phone 8000b is established in the following manner. A voice input to the microphone 8011 of the IP phone 8000a is converted by the A/D converter 8020 into a digital signal which is input to the two-channel communication apparatus 800. CPU 1 in the two-channel communication apparatus 800 converts the digital signal into a voice packet which is sent as a transmission packet from MAC 300a to the Ethernet cable 820a. The packet sent to the Ethernet cable 820a is sent to the partner IP phone 8000b via HUB 8100a and WAN. Upon reception of the voice packet transmitted from the IP phone 8000a, CPU 1 in the two-channel communication apparatus 800 of the partner IP phone 8000b converts the received voice packet into voice data which is output to the D/A converter 8030. This voice data is converted by the D/A converter 8030 into a voice analog signal which is output as a voice from the speaker 8012. A communication process from the IP phone 8000b to the IP phone 8000a is performed in the similar manner to establish speech between the IP phone 8000a and IP phone 8000b.

Next, the process of reading a home page in the data center 8200 from PC 830 connected via the IP phone 8000a is performed in the following manner. When PC 830 displays a home page by using a web browser, a packet having an URL of the home page is transmitted to the Ethernet cable 820b. Upon receiving this packet at MAC 300b of the two-channel communication apparatus 800, this packet is transferred from MAC 300a to the Ethernet cable 820a because the MAC address of this packet is not destined for the IP phone 8000. The transferred packet arrives at the data center 8200 via HUB 8100 and WAN. The data center 8200 reads URL information from the packet transmitted from PC 830 and packetizes a corresponding home page and transmits the packet. The packet transmitted from the data center 8200 arrives at HUB 8100 via WAN and is received at MAC 300a in the two-channel communication apparatus 800 via the Ethernet cable 820a. The transfer judging circuit 200 in the two-channel communication apparatus 800 searches the destination MAC address of the packet transmitted from the data center 8200 and if it is judged that the destination MAC address is destined for PC 830, this packet is transferred to the Ethernet cable 820b.

Upon reception of the packet at PC 830, PC 830 derives home page data from the received packet and displays it by using the web browser. With the above-described processes, communication between the data center 8200 and PC 830 becomes possible via the IP phone 8000.

The two voice processes (a process of converting a digital signal into a voice packet and a process of converting a voice packet into a digital signal) to be executed by CPU 1 and transfer of a voice packet on an Ethernet system are required to have a real time nature of performing communication between two IP phones 8000 in a predetermined time period in order to prevent noises and speech delay and to transmit voices smoothly. It is therefore necessary to transfer a voice packet by using a tagged packet with which CPU 1 can execute the voice processes with a priority over other processes and to which priority order can be added even by the Ethernet system.

From the above reasons, communication between HUB and the IP phone 8000 is performed by using the tagged packet. In addition, there is a packet transfer process for communication between the data center 8200 and PC 830 so that there is a possibility that a tagged packet is sent also to PC 300.

If PC 830 cannot receive the tagged packet, it is necessary to convert the tagged packet to be transferred from the IP phone 8000 to PC 830 into a basic packet. In this case, if the packet conversion is performed at CPU 1, the load on CPU 1 increases so that the voice processes may be delayed and the number of transfer packets may increase which are necessary for packet conversion but cannot be processed, resulting in dropping the transfer packets. An Ethernet efficiency is lowered and the real time nature of voice packets can not be maintained.

By adopting the method of this invention, CPU and transfer processes can be made to have a zero overhead. It is therefore possible to smoothly perform the voice processes and voice packet communication.

Although the embodiments of the invention have been described above, the invention is not limited only thereto, but it is apparent to those skilled in the art that various alterations and modifications can be made without departing from the spirit of the invention and the scope of appended claims.

It is possible to establish a connection to a communication object unable to transmit/receive a packet with priority information stipulated in IEEE 802.1Q. Transmission/reception judgement and packet conversion for packet transfer can be made to have a zero overhead, and the generation and processing means for performing transmission/reception judgement and packet conversion can be made to have a zero load. It is therefore possible to improve the communication efficiency and the process performance of the generating and processing means.

What is claimed is:

1. A packet communication apparatus comprising:
    a plurality of communication means for transmitting and receiving packets including multimedia data, to and from a plurality of communication objects,
    wherein said plurality of communication objects each has a function of transmitting packets without priority information,
    wherein the plurality of communication objects is connected by an Ethernet network,
    wherein the packet communication apparatus has a function of receiving packets with or without priority information, and includes a terminal processing function for communicating by packets with said communication objects, and
    wherein the packet communication apparatus includes a relay function for relaying packets among said communication objects;
    packet generating and processing means for generating packets to be transmitted by said plurality of communication means and for processing packets received by said plurality of communication means for communication with the plurality of communication objects;
    transfer packet buffer means for storing a transfer packet,
    wherein said packet communication apparatus transfers the transfer packet from one communication object of the plurality of communication objects to another communication object of the plurality of communication objects;
    packet conversion means for converting a transmission packet generated by said packet generating and processing means, and for converting a transfer packet to be transmitted from said plurality of communication means,
    wherein, as a result of converting by the packet conversion means, a communication object for a destination of the transmission packet can receive the transmission packet, and a communication object for a destination of the reception packet can receive the reception packet,
    wherein said packet conversion means has a conversion function of converting a packet with a priority information into a packet without a priority information, and
    wherein said packet conversion means has a conversion function of converting a packet without priority information into a packet with priority information; and
    transfer control means for outputting, when the reception packet received by said communication means is judged as the transfer packet, the reception packet to said transfer buffer means, for outputting the transmission packet to said communication means corresponding to the communication object at a destination of the transmission packet generated by said packet generating and processing means, and for outputting the transfer packet to said communication means corresponding to the communication object at a destination of the transfer packet stored in said transfer buffer means.

2. A packet communication apparatus according to claim 1, wherein:
    said packet conversion means includes a packet conversion mode setting register settable by said packet generating and processing means; and
    if said transfer control means judges that the reception packet received by said communication means is the reception packet to be processed by said packet generating and processing means and when said transfer control means outputs the reception packet to said packet generating and processing means, said packet conversion means converts the reception packet into a packet capable of being processed by said packet generating and processing means in accordance with a value set to said packet conversion mode setting register.

3. A packet communication apparatus according to claim 2, wherein:
    said packet conversion means includes transmission packet conversion mode determining means for determining a packet conversion mode in accordance with a packet conversion mode register settable by said packet generating and processing means or the communication objects at a source and a destination of the transmission packet to be transmitted from said communication means; and
    when said transfer control means outputs the transmission packet to said communication means corresponding to the communication object at a destination of the transmission packet generated by said packet generating and processing means and outputs the transfer packet to said communication means corresponding to the communication object at a destination of the transfer packet stored in said transfer buffer means, said packet conversion means converts the transfer packet in accordance with the packet conversion mode register or said transmission packet conversion mode determining means.

4. A packet communication apparatus according to claim 1, wherein:
    said packet conversion means includes transfer packet conversion mode determining means for determining a packet conversion mode in accordance with a packet conversion mode setting register settable by said packet generating and processing means or the communication objects at a source and a destination of the transfer packet; and
    if said transfer control means judges that the reception packet received by said communication means is the transfer packet and when said transfer control means outputs the transfer packet to said transfer buffer means, said packet conversion means converts the transfer packet in accordance with the packet conversion mode register or said transfer packet conversion mode determining means.

5. A packet communication apparatus according to claim 3, further comprising:
    a conversion function of converting a packet without priority information into a packet with priority information and count means for identifying each frame constituting a packet, respectively provided in said packet conversion means;

a register capable of being set with priority information by said packet generating and processing means, the priority information being inserted when the packet without priority information is converted into the packet with priority information; and packet conversion mode determining means having a priority information determining function of determining the priority information to be inserted, in accordance with the communication object at a source or at a destination of a packet, wherein it is judged by using said count means whether the packet is a packet with priority information or a packet without priority information, a position of the frame without priority information at which a frame with priority information is inserted is detected by using said count means, and the packet without priority information is converted into the packet with priority information by inserting a frame with a priority degree determined in accordance with said priority information setting register and said packet conversion mode determining means at the position where the frame with priority information is inserted.

6. A packet communication apparatus according to claim 3, wherein said packet conversion means has a conversion function of converting a packet with priority information into a packet without priority information and count means for identifying each frame constituting a packet, it is judged by using said count means whether the packet is a packet with priority information or a packet without priority information, a position of the frame with priority information in the packet with priority information is detected by using said count means, and the packet with priority information is converted into the packet without priority information by outputting all frames constituting the packet excepting the frame with priority information.

7. A packet communication apparatus according to claim 1, wherein:

said packet conversion means includes transmission packet conversion mode determining means for determining a packet conversion mode in accordance with a packet conversion mode register settable by said packet generating and processing means or the communication objects at a source and a destination of the transmission packet to be transmitted from said communication means; and when said transfer control means outputs the transmission packet to said communication means corresponding to the communication object at a destination of the transmission packet generated by said packet generating and processing means and outputs the transfer packet to said communication means corresponding to the communication object at a destination of the transfer packet stored in said transfer buffer means, said packet conversion means converts the transfer packet in accordance with the packet conversion mode register or said transmission packet conversion mode determining means.

8. A packet communication apparatus according to claim 1, wherein said packet conversion means has a conversion function of converting a packet with priority information into a packet without priority information.

9. A packet communication apparatus according to claim 1, wherein said packet conversion means has a conversion function of converting a packet without priority information into a packet with priority information.

10. A packet communication apparatus according to claim 1, wherein said packet conversion means has a conversion function of converting a packet with priority information into a packet without priority information and count means for identifying each frame constituting a packet, it is judged by using said count means whether the packet is a packet with priority information or a packet without priority information, a position of the frame with priority information in the packet with priority information is detected by using said count means, and the packet with priority information is converted into the packet without priority information by outputting all frames constituting the packet excepting the frame with priority information.

11. A packet communication apparatus according to claim 1, further comprising:

a conversion function of converting a packet without priority information into a packet with priority information and count means for identifying each frame constituting a packet, respectively provided in said packet conversion means;

a register capable of being set with priority information by said packet generating and processing means, the priority information being inserted when the packet without priority information is converted into the packet with priority information; and packet conversion mode determining means having a priority information determining function of determining the priority information to be inserted, in accordance with the communication object at a source or at a destination of a packet, wherein it is judged by using said count means whether the packet is a packet with priority information or a packet without priority information, a position of the frame without priority information at which a frame with priority information is inserted is detected by using said count means, and the packet without priority information is converted into the packet with priority information by inserting a frame with a priority degree determined in accordance with said priority information setting register and said packet conversion mode determining means at the position where the frame with priority information is inserted.

12. A packet communication apparatus according to claim 1, wherein a plurality of packet communication apparatuses are connected in series without a hub such that said plurality of packet communication apparatuses include a function of transferring packets.

13. A packet communication apparatus comprising:

at least two communication means for performing packet communication among a plurality of communication objects by using a packet (new standard packet) with priority information and a packet (old standard packet) without priority information;

packet transfer means for transferring a packet among said communication means;

calculation means for performing a network terminal process requiring real time operations; and storage means for storing data and at least one program to be executed by said calculation means, and for storing a packet to be transmitted/received by said calculation means, wherein when the communication object cannot receive the new standard packet, said packet transfer means converts the new standard packet into the old standard packet and transfers the old standard packet to the communication object, wherein said packet transfer means has a conversion function of converting a new standard packet into an old standard packet and wherein said packet transfer means has a conversion function of converting an old standard packet into a new standard packet.

14. A packet communication apparatus according to claim 13, further comprising at least one control register capable of being set with a presence/absence of packet conversion by said calculation means, wherein if it is judged that the communication object cannot receive the packet with priority information, said control register is changed from a new standard compatible mode to an old standard compatible mode in a closed manner within the apparatus in accordance with the program stored in said storage means.

15. A packet communication apparatus according to claim 14, further comprising a buffer for temporarily storing a packet to be transferred, wherein conversion from the new standard packet to the old standard packet is realized by dropping only the priority information without inputting the priority information into said buffer.

16. A packet communication apparatus according to claim 15, further comprising a content addressable memory or a RAM table for storing information on whether each of the communication objects corresponds to either the new standard packet or the old standard packet, wherein packet information basing upon the stored information is performed in a closed manner within the packet communication apparatus.

17. A packet communication apparatus according to claim 14, further comprising a content addressable memory or a RAM table for storing information on whether each of the communication objects corresponds to either the new standard packet or the old standard packet, wherein packet information basing upon the stored information is performed in a closed manner within the packet communication apparatus.

18. A packet communication apparatus according to claim 13, wherein if the program stored in said storage means to be executed by said calculation means cannot process the new standard packet, said transfer means converts the new standard packet into the old standard packet, stores the old standard packet in said storage means, and converts the old standard packet stored in said storage means into the new standard packet to transmit the new standard packet from said communication means.

19. A packet communication apparatus according to claim 18, further comprising a control register capable of being set with a presence/absence of packet conversion by said calculation means, wherein if a program to be executed by said calculation means cannot process the packet with priority information, said control register is changed from a new standard compatible mode to an old standard compatible mode in a closed manner within the apparatus in accordance with the same program as the program stored in said storage means or a different program.

20. A packet communication apparatus according to claim 18, further comprising a register capable of being set with priority information by said calculation means, the priority information being inserted when a transmission packet stored in said storage means is converted from the old standard packet into the new standard packet, wherein if a program to be executed by said calculation means cannot process the packet with priority information, setting the priority information to said register is performed in a closed manner in the apparatus in accordance with the same program as the program stored in said storage means or a different program.

* * * * *